United States Patent
Tanimoto

(10) Patent No.: US 7,142,320 B2
(45) Date of Patent: Nov. 28, 2006

(54) INTERNET FACSIMILE MACHINE WITH COMMUNICATION MANAGEMENT RECORDING FUNCTION

(75) Inventor: Yoshifumi Tanimoto, Hirakata (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 828 days.

(21) Appl. No.: 10/202,305

(22) Filed: Jul. 23, 2002

(65) Prior Publication Data
US 2003/0020961 A1    Jan. 30, 2003

(30) Foreign Application Priority Data
Jul. 25, 2001    (JP)    ............... 2001-224932

(51) Int. Cl.
*G06F 3/12* (2006.01)
*G06K 1/00* (2006.01)

(52) U.S. Cl. ............... 358/1.15; 358/402; 379/93.24; 379/100.08

(58) Field of Classification Search ............... 358/1.15, 358/402, 405, 440; 379/93.24, 100.08
See application file for complete search history.

(56) References Cited

U.S. PATENT DOCUMENTS

| | | | | |
|---|---|---|---|---|
| 6,072,599 A | * | 6/2000 | Oba et al. | 358/444 |
| 6,219,150 B1 | * | 4/2001 | Eguchi | 358/1.15 |
| 6,350,066 B1 | * | 2/2002 | Bobo, II | 709/206 |
| 6,437,873 B1 | * | 8/2002 | Maeda | 358/1.15 |
| 6,608,694 B1 | * | 8/2003 | Akimoto | 358/1.15 |
| 6,687,742 B1 | * | 2/2004 | Iwazaki | 709/206 |

FOREIGN PATENT DOCUMENTS

| | | |
|---|---|---|
| JP | 10-091553 | 4/1998 |
| JP | 2001-160879 | 6/2001 |

* cited by examiner

Primary Examiner—Kimberly Williams
Assistant Examiner—Dillon Murphy
(74) Attorney, Agent, or Firm—Hogan & Hartson LLP

(57) ABSTRACT

An Internet facsimile machine including a processor having an ability exchanging function for transmitting to a receiving device a first electronic mail that includes format information of original image data and standard format image data, transmitting a second electronic mail that includes machine receiving ability information of the receiving device, and transmitting a third electronic mail that includes image data formed from the original image data in accordance with the machine receiving ability information. The processor has a communication management recording function for storing a communication record table of the series of electronic mails and outputting the communication record table. A storage device stores communication identifying information and communication procedure information for the series of electronic mails as a plurality of communication records and a communication records outputting device outputs the communication records formed in accordance with the communication identifying information and the communication procedure information.

16 Claims, 23 Drawing Sheets

T1

| SPEED DIAL NUMBER | NAME OF DESTINATION | E-MAIL ADDRESS | RECEIVING ABILITY |
|---|---|---|---|
| 001 | AAA MACHINERY CO. | YOU@tmB.NET | dpi=400,image-coding=MMR,paper-size=A4 |
| 002 | BBB MACHINERY CO. | 123@def.co.jp | dpi=400,image-coding=MMR,paper-size=A4 |
| 003 | CCC MACHINERY CO. | 456@deg.co.jp | dpi=200,image-coding=MH,paper-size=A4 |
| 004 | DDD TRADING CO. | MMM@tmC.NET | dpi=200,image-coding=MMR,paper-size=B5 |
| 005 | EEE TRADING CO. | aaa@abc.co.jp | |
| 006 | FFF TRADING CO. | abc@zzz.co.jp | |

| SPEED DIAL NUMBER | NAME OF DESTINATION | E-MAIL ADDRESS | RECEIVING ABILITY |
|---|---|---|---|
| 001 | AAA MACHINERY CO. | YOU@tmB.NET | dpi=400,image-coding=MMR,paper-size=A4 |
| 002 | BBB MACHINERY CO. | 123@def.co.jp | dpi=400,image-coding=MMR,paper-size=A4 |
| 003 | CCC MACHINERY CO. | 456@deg.co.jp | dpi=200,image-coding=MH,paper-size=A4 |
| 004 | DDD TRADING CO. | MMM@tmC.NET | dpi=200,image-coding=MMR,paper-size=B5 |
| 005 | EEE TRADING CO. | aaa@abc.co.jp | |
| 006 | FFF TRADING CO. | abc@zzz.co.jp | |

```
Date: Wed,20 Sep 1995 00:16:00 +0900
From: Sender@terminalA.ifax
Message-Id: <199509200017.12345@terminalA.ifax>
original-Message-Id: <199509200019.12345@terminalB.ifax>
Subject: Internet FAX Full mode Sample2
To: Recipient@terminalB.ifax MIME-Version: 1.0
Content-Type: multipart/mixed;
     boundary="RAA14128.773615768"

--RAA14128.773615768
Content-type: image/tiff;application=faxbw
Content-Transfer-Encoding:base64
```

15(15A) — IMAGE DATA

`--RAA14128.773615768--`

(b)

```
Date: Wed,20 Sep 1995 00:17:00 +0900
From: Sender@terminalA.ifax
Message-Id: <199509200018.12345@terminalA.ifax>
original-Message-Id: <199509200019.12345@terminalB.ifax>
Subject: Internet FAX Full mode Sample2
To: Recipient@terminalB.ifax
```
16 — `Disposition-Notification-To: Sender@terminalA.ifax`
```
MIME-Version: 1.0
Content-Type: multipart/mixed;
     boundary="RAA14128.773615768"

--RAA14128.773615768
Content-type: image/tiff;application=faxbw
Content-Transfer-Encoding:base64
```

15(15A) — IMAGE DATA

`--RAA14128.773615768--`

```
Date: Wed,20 Sep 1995 00:19:00 +0900
From: Recipient@terminalB.ifax
Message-Id: <199509200020.12345@terminalB.ifax>
Subject: Re:Internet FAX Full mode Sample1
```
29 — `To: Sender@terminalA.ifax`
```
MIME-Version: 1.0
Content-Type: multipart/report;
      report-type=disposition-notification;
      boundary="RAA14128.773615766"

--RAA14128.773615766
```

30 —
```
The message sent on 1995 Sep 20 at 00:18:00 +0900 to
Recipient@terminalB.ifax with subject 'Internet FAX
Full Mode Sample1' has been recieved. An alternative
form of the message data is requested.
```

```
--RAA14128.773615766
Content-Type: message/disposition-notification
```

31 —
```
Reporting-UA: Recipient.terminalB.ifax;iFAX-FullMode
Original-Recipient: rfc822;Recipient@terminalB.ifax
Final-Recipient: rfc822;Recipient@terminalB.ifax
```
22 — `Original-message-ID: <199509200019.12345@terminalA.ifax>`
```
Disposition: automatic-action/MDN-sent-automatically;
      deleted/alternative-preferred
```

19 —
```
Media-Accept-Features:
  (& (color=Binary)
    (image-file-structure=TIFF)
    (| (& (dpi=200Xdpi-xyratio=200/100))
       (& (dpi=200Xdpi-xyratio=1))
       (& (dpi=400Xdpi-xyratio=1)))
    (| (image-coding=MH,MR,MMR)
       (& (image-coding=JBIG)
          (image-coding-constraint=JBIG-T85)
          (JBIG-stripe-size=128)))
    (MRC-mode=0)
    (paper-size={A4,B4})
    (ua-media=stationery))
```

```
--RAA14128.773615766--
```

TRANSMISSION RECORD  28a(28)

| ABILITY EXCHANGING FUNCTION | DESTINATION | DATE AND TIME | SUBJECT | RESULT |
|---|---|---|---|---|
| 1 TRANSMISSION 1 | ifax@fullmode.fax | 03/01 14:00 | Transmission 1 | COMPLETED |
|  | abc@abc.com | 03/01 14:01 | abcdefg | COMPLETED |
| 2 TRANSMISSION 1 | ifax@fullmode2.fax | 03/01 14:02 | Transmission 1 | DURING COMMUNICATION |
|  | test@test.co.jp | 03/01 14:03 | test document | COMPLETED |
|  | you@hello.net | 03/01 14:04 | sample |  |
| 1 TRANSMISSION 2 | ifax@fullmode.fax | 03/01 14:05 | Transmission 1-2 | DURING COMMUNICATION |

101(T01), 102, 103(T01), 104, 105, 106(T02)
45: communication identifying information
46: communication procedure information (b)

RECEPTION RECORD  28b(28)

| ABILITY EXCHANGING FUNCTION | ORIGIN | DATE AND TIME | SUBJECT | RESULT |
|---|---|---|---|---|
| 1 RECEIVING 1 | ifax@fullmode.fax | 03/01 14:02 | Re: Transmission 1 | COMPLETED |
|  | 1234@5678.com | 03/01 14:04 | hello | COMPLETED |
|  | hello@xyz.com | 03/01 14:05 | abcde | COMPLETED |
|  |  |  |  |  |
|  |  |  |  |  |
|  |  |  |  |  |

121(R01), 122, 123

28 : COMMUNICATION RECORD TABLE
45 : COMMUNICATION IDENTIFYING INFORMATION
46 : COMMUNICATION PROCEDURE INFORMATION

TRANSMISSION RECORD                                                                28a(28)

| ABILITY EXCHANGING FUNCTION | DESTINATION | DATE AND TIME | SUBJECT | RESULT |
|---|---|---|---|---|
| [1] TRANSMISSION 1 | ifax@fullmode.fax | 03/01 14:00 | Transmission 1 | COMPLETED |
|  | abc@abc.com | 03/01 14:01 | abcdefg | ERROR |
| [2] TRANSMISSION 1 | ifax@fullmode2.fax | 03/01 14:02 | Transmission 1 | COMPLETED |
|  | test@test.co.jp | 03/01 14:03 | test document | COMPLETED |
|  | you@hello.net | 03/01 14:04 | sample | COMPLETED |
| [1] TRANSMISSION 2 | ifax@fullmode.fax | 03/01 14:05 | Transmission 1-2 | COMPLETED |
| [2] TRANSMISSION 2 | ifax@fullmode2.fax | 03/01 14:06 | Transmission 1-2 | ERROR |

101(T01), 102, 103(T01), 104, 105, 106(T02), 107(T02), 45, 46

(b)

RECEPTION RECORD                                                                28b(28)

| ABILITY EXCHANGING FUNCTION | ORIGIN | DATE AND TIME | SUBJECT | RESULT |
|---|---|---|---|---|
| [1] RECEIVING 1 | ifax@fullmode.fax | 03/01 14:02 | Re: Transmission 1 | COMPLETED |
| [2] RECEIVING 1 | ifax@fullmode2.fax | 03/01 14:05 | Re: Transmission 1 | COMPLETED |
|  | 1234@5678.com | 03/01 14:04 | hello | COMPLETED |
|  | hello@xyz.com | 03/01 14:05 | abcde | COMPLETED |
| [1] RECEIVING 2 | ifax@fullmode.fax | 03/01 14:06 | Re: Transmission 1-2 | COMPLETED |
|  | you@hello.net | 03/01 14:08 | Re: sample | COMPLETED |
| [2] RECEIVING 2 | ifax@fullmode2.fax | 03/01 14:08 | Re: Transmission 1-2 | ERROR |

```
RECEIVING ABILITY OF DESIGNATED
DESTINATION MACHINE IS AS FOLLOWS
    RESOLUTION         : 400dpi
    ENCODING METHOD    : MMR
    RECORDING PAPER SIZE : A4

PLEASE SELECT COMMUNICATION MODE
    (1) COMMUNICATION MODE 1
    (2) COMMUNICATION MODE 2
    (3) COMMUNICATION MODE 3
    (4) COMMUNICATION MODE 4
    (5) COMMUNICATION MODE 5
```
← 27a

10a (b)

```
RECEIVING ABILITY INFORMATION OF
DESTINATION MACHINE IS NOT REGISTERED

PLEASE SELECT COMMUNICATION MODE
    (1) COMMUNICATION MODE 1
    (2) COMMUNICATION MODE 2
    (3) COMMUNICATION MODE 3
    (4) COMMUNICATION MODE 4
    (5) COMMUNICATION MODE 5
```
← 27b

TRANSMISSION RECORD

| | NUMBER | DESTINATION | DATE AND TIME | SUBJECT | RESULT |
|---|---|---|---|---|---|
| T01(41) | 1 | ifax@fullmode.fax | 03/01 14:00 | Transmission 1 | COMPLETED |
| | 2 | abc@abc.com | 03/01 14:01 | abcdefg | ERROR |
| T01 | 3 | ifax@fullmode2.fax | 03/01 14:02 | Transmission 1 | COMPLETED |
| | 4 | test@test.co.jp | 03/01 14:03 | test document | COMPLETED |
| | 5 | you@hello.net | 03/01 14:04 | sample | COMPLETED |
| T02(42) | 6 | ifax@fullmode.fax | 03/01 14:05 | Transmission 1-2 | COMPLETED |
| T02 | 7 | ifax@fullmode2.fax | 03/01 14:06 | Transmission 1-2 | ERROR |

(b)

RECEPTION RECORD

| | NUMBER | ORIGIN | DATE AND TIME | SUBJECT | RESULT |
|---|---|---|---|---|---|
| R01(43) | 1 | ifax@fullmode.fax | 03/01 14:02 | Re: Transmission 1 | COMPLETED |
| | 2 | 1234@5678.com | 03/01 14:04 | hello | COMPLETED |
| | 3 | hello@xyz.com | 03/01 14:05 | abcde | COMPLETED |
| R01 | 4 | ifax@fullmode2.fax | 03/01 14:05 | Re: Transmission 1 | COMPLETED |
| R02(44) | 5 | ifax@fullmode.fax | 03/01 14:06 | Re: Transmission 1-2 | COMPLETED |
| | 6 | you@hello.net | 03/01 14:08 | Re: sample | COMPLETED |
| R02 | 7 | ifax@fullmode2.fax | 03/01 14:08 | Re: Transmission 1-2 | ERROR |

TRANSMISSION RECORD

| NUMBER | DESTINATION | DATE AND TIME | SUBJECT | RESULT |
|---|---|---|---|---|
| 1 | ifax@fullmode.fax | 03/01 14:00 | Transmission 1 | COMPLETED |
| 2 | abc@abc.com | 03/01 14:01 | abcdefg | ERROR |
| 3 | ifax@fullmode2.fax | 03/01 14:02 | Transmission 1 | COMPLETED |
| 4 | test@test.co.jp | 03/01 14:03 | test document | COMPLETED |
| 5 | you@hello.net | 03/01 14:04 | sample | COMPLETED |
| 6 | ifax@fullmode.fax | 03/01 14:05 | Transmission 1-2 | COMPLETED |
| 7 | ifax@fullmode2.fax | 03/01 14:06 | Transmission 1-2 | ERROR |

T01 → rows 1, 3
T02 → rows 6, 7
35, 10a (b)

RECEPTION RECORD

| NUMBER | ORIGIN | DATE AND TIME | SUBJECT | RESULT |
|---|---|---|---|---|
| 1 | 1234@5678.com | 03/01 14:04 | hello | COMPLETED |
| 2 | hello@xyz.com | 03/01 14:05 | abcde | COMPLETED |
| 3 | you@hello.net | 03/01 14:08 | Re: sample | COMPLETED |

TRANSMISSION RECORD — 46

| | NUMBER | DESTINATION | DATE AND TIME | SUBJECT | RESULT |
|---|---|---|---|---|---|
| T01 | 1-TRANSMISSION 1 | ifax@fullmode.fax | 03/01 14:00 | Transmission 1 | COMPLETED |
| T02 | 1-TRANSMISSION 2 | ifax@fullmode.fax | (03/01 14:05) | Transmission 1-2 | COMPLETED |
| | 2 | abc@abc.com | 03/01 14:01 | abcdefg | ERROR |
| T01 | 3-TRANSMISSION 1 | ifax@fullmode2.fax | 03/01 14:02 | Transmission 1 | COMPLETED |
| T02 | 3-TRANSMISSION 2 | ifax@fullmode2.fax | (03/01 14:06) | Transmission 1-2 | ERROR |
| | 4 | test@test.co.jp | 03/01 14:03 | test document | COMPLETED |
| | 5 | you@hello.net | 03/01 14:04 | sample | COMPLETED |

— 37
— 10a (b)

RECEPTION RECORD

| | NUMBER | ORIGIN | DATE AND TIME | SUBJECT | RESULT |
|---|---|---|---|---|---|
| R01 | 1-RECEIVING 1 | ifax@fullmode.fax | 03/01 14:02 | Re: Transmission 1 | COMPLETED |
| R02 | 1-RECEIVING 2 | ifax@fullmode.fax | (03/01 14:06) | Re: Transmission 1-2 | COMPLETED |
| | 2 | 1234@5678.com | 03/01 14:04 | hello | COMPLETED |
| | 3 | hello@xyz.com | 03/01 14:05 | abcde | COMPLETED |
| R01 | 4-RECEIVING 1 | ifax@fullmode2.fax | 03/01 14:05 | Re: Transmission 1 | COMPLETED |
| R02 | 4-RECEIVING 2 | ifax@fullmode2.fax | (03/01 14:08) | Re: Transmission 1-2 | ERROR |
| | 5 | you@hello.net | 03/01 14:08 | Re: sample | COMPLETED |

TRANSMISSION RECORD

| NUMBER | DESTINATION | DATE AND TIME | SUBJECT | RESULT |
|---|---|---|---|---|
| 1 | abc@abc.com | 03/01 14:01 | abcdefg | COMPLETED |
| 2 | test@test.co.jp | 03/01 14:03 | test document | COMPLETED |
| 3 | you@hello.net | 03/01 14:04 | sample | COMPLETED |
| 4 | ifax@fullmode.fax | 03/01 14:05 (14:00 – 14:06, 0:06) | Transmission 1-2 | COMPLETED |
| 5 | ifax@fullmode2.fax | 03/01 14:06 (14:01 – 14:07, 0:06) | Transmission 1-2 | COMPLETED |

T02 → rows 4, 5; 39; 10a (b)

RECEPTION RECORD

| NUMBER | ORIGIN | DATE AND TIME | SUBJECT | RESULT |
|---|---|---|---|---|
| 1 | 1234@5678.com | 03/01 14:04 | hello | COMPLETED |
| 2 | hello@xyz.com | 03/01 14:05 | abcde | COMPLETED |
| 3 | you@hello.net | 03/01 14:08 | Re: sample | COMPLETED |

TRANSMISSION RECORD

| NUMBER | DESTINATION | DATE AND TIME | SUBJECT | RESULT |
|---|---|---|---|---|
| 1 | abc@abc.com | 03/01 14:01 | abcdefg | COMPLETED |
| 2 | test@test.co.jp | 03/01 14:03 | test document | COMPLETED |
| 3 | you@hello.net | 03/01 14:04 | sample | COMPLETED |
| 4 | ifax@fullmode.fax | 03/01 14:05 (14:00 – 14:06, 0:06) | Transmission 1-2 | TRANSMISSION 2 ERROR |
| 5 | ifax@fullmode2.fax | 03/01 14:06 (14:01 – 14:08, 0:07) | Transmission 1-2 | TRANSMISSION 1 ERROR |

(b)

RECEPTION RECORD

| NUMBER | ORIGIN | DATE AND TIME | SUBJECT | RESULT |
|---|---|---|---|---|
| 1 | 1234@5678.com | 03/01 14:04 | hello | COMPLETED |
| 2 | hello@xyz.com | 03/01 14:05 | abcde | COMPLETED |
| 3 | you@hello.net | 03/01 14:08 | Re: sample | COMPLETED |

Fig.23

INTERNET FACSIMILE MACHINE WITH COMMUNICATION MANAGEMENT RECORDING FUNCTION

FIELD OF THE INVENTION

The present invention relates to an Internet facsimile machine for transmitting and receiving image data by electronic mail, and more particularly to an Internet facsimile machine provided with a function for transmitting to a receiving side machine the image data in a format appropriate to a receiving ability of the receiving side machine, and a communication management recording function.

DESCRIPTION OF THE RELATED ART

According to the general Internet facsimile communication, since the format of the image data to be transmitted and received reciprocally by the Internet facsimile machines is standardized (for example, standardize into the image data wherein recording paper size is A4, encoding method is MH (Modified Huffman) method, resolution is 200 dpi), even in the case the Internet facsimile machine of a transmitting side is not aware of a receiving ability information of the Internet facsimile machine of the receiving side, the transmission and reception can be carried out without problem.

Recently, for transmitting and receiving the image data higher in its quality than the image data of standardized format (hereinafter referred to as the "standard format"), it is proposed of the Internet facsimile machine for transmitting the image data in the format most appropriate to the receiving ability of the Internet facsimile machine of the receiving side, after obtaining under predetermined method, information concerning printable recording paper size, receivable resolution, decodable encoding method or the like, as the information concerning the receiving ability of the Internet facsimile machine of the receiving side (hereinafter referred to as the "receiving ability information").

According to a communication procedure of the above-mentioned Internet facsimile communication, first, the Internet facsimile machine of the transmitting side forms an original image data high in the resolution directly from an original or the like scanned by a scanner, and holds onto such original image data. Then, the Internet facsimile machine of the transmitting side forms an electronic mail that is written with information concerning the formed original image data, and the message for requesting a notification of the receiving ability. In addition, the Internet facsimile machine of the transmitting side converts the format of the original image data, attaches the formed standard format image data to the electronic mail, and transmits the electronic mail. Meanwhile, the Internet facsimile machine of the receiving side that received the electronic mail, forms the electronic mail that is written with the receiving ability information of the machine itself by following the message, and the message indicating the transmission of the image data higher in its quality. Then, the formed electronic mail is returned to the Internet facsimile machine of the transmitting side. Lastly, the Internet facsimile machine of the transmitting side that received the electronic mail, forms the image data in the format most appropriate to the receiving ability of the Internet facsimile machine of the receiving side in accordance with the receiving ability information, and transmits the image data to the Internet facsimile machine of the receiving side.

However, when transmitting the image data in the above-mentioned Internet facsimile communication (ability exchanging function), since a plurality of electronic mails is to be exchanged with the Internet facsimile machine of the receiving side for transmission of single original, by outputting and displaying communication records to a display or the like by the communication management recording function, the communication records are to be displayed as separate communication record, although the communication records relate to a series of communication. For example, as shown in communication record screens 33, 34 in FIG. 19, although the transmission record 41, the transmission record 42, and the reception record 43, the reception record 44 compose the series of the communication, the communication records are displayed under a format same as the format for the general communication record not using the ability exchanging function. Therefore, although the communication is single transmission substantially, the communication record is displayed as the communication record of four communications, and it is difficult to grasp the substantial communication record.

SUMMARY OF THE INVENTION

An advantage of the present invention is to provide an Internet facsimile machine that is capable of grasping a substantial communication record easily, even when an image data is transmitted by using an ability exchanging function.

The Internet facsimile machine of the present invention includes a storing device for storing a communication identifying information and a communication procedure information by including into a communication record table of a series of the electronic mails that are transmitted and received at the transmission or reception of the image data by the ability exchanging function. In addition, the Internet facsimile machine of the present invention includes a communication records outputting device for outputting communication records formed in accordance with the communication identifying information and the communication procedure information when outputting the communication record table by a communication management recording function. Therefore, even when the communication record table is displayed for a plurality of electronic mails relating to the transmission or reception by an ability exchanging function, an operator is capable of grasping as a single transmission or reception.

In addition, when outputting the communication record table by the communication management recording function, for the communication records of the series of the electronic mails, the communication records outputting device outputs so that at least two communication records are displayed consecutively among the series of the electronic mails, in accordance with the communication identifying information and the communication procedure information. Therefore, for example, by looking at the communication records displayed consecutively for the same destination or the same origin, the operator can grasp the communication record table as relating to the transmission or reception by the ability exchanging function.

Moreover, when displaying the communication record table by the communication management recording function, for the communication records of the series of the electronic mails, the communication records outputting device outputs only a transmission record or a reception record relating to the electronic mail having substantial content (image data) among the communication records of the series of the electronic mails in accordance with the communication procedure information. Therefore, the displaying of the communication records relating to the electronic mail not having the substantial content is abbreviated, and a communication record screen can be displayed in the manner easily understandable by the operator.

Furthermore, when displaying the communication record table by the communication management recording function, for the communication records of the series of the electronic mails, the communication records outputting device outputs only the transmission record or the reception record of the electronic mail for transmitting or receiving the image data formed in accordance with the machine receiving ability information, among the communication records of the series of the electronic mails, in accordance with the communication identifying information and the communication procedure information. Therefore, it can be prevented of the confusion of the operator due to the communication records being displayed meaninglessly afterward.

BRIEF DESCRIPTION OF THE DRAWINGS

FIG. 2 is a view showing an example of data table that stores receiving ability information or the like of destination machine by associating to destination information;

FIG. 4 is a view showing an example of electronic mail that is attached with standard format (or high quality) image data;

FIG. 6 is a view showing an example of electronic mail transmitted by the Internet facsimile machine of the receiving side for requesting the high quality image data to the Internet facsimile machine of the transmitting side;

FIG. 9 is a view showing an example of communication record table;

FIG. 10 is a view showing an example of communication record table;

FIG. 14 is a view showing an example of the communication mode selecting screen.

FIG. 19 is a view showing an example of communication record screen;

FIG. 20 is a view showing an example of communication record screen;

FIG. 21 is a view showing an example of communication record screen;

FIG. 22 is a view showing an example of communication record screen; and

FIG. 23 is a view showing an example of communication record screen.

DETAILED DESCRIPTION OF THE PREFERRED EMBODIMENTS

An Internet facsimile machine according to an embodiment of the present invention will be described in accordance with the drawings. The Internet facsimile machine of a side to transmit an image data will be referred to as the "Internet facsimile machine of the transmitting side", and the Internet facsimile machine of a side to receive the image data will be referred to as the "Internet facsimile machine of the receiving side".

Figure 1:
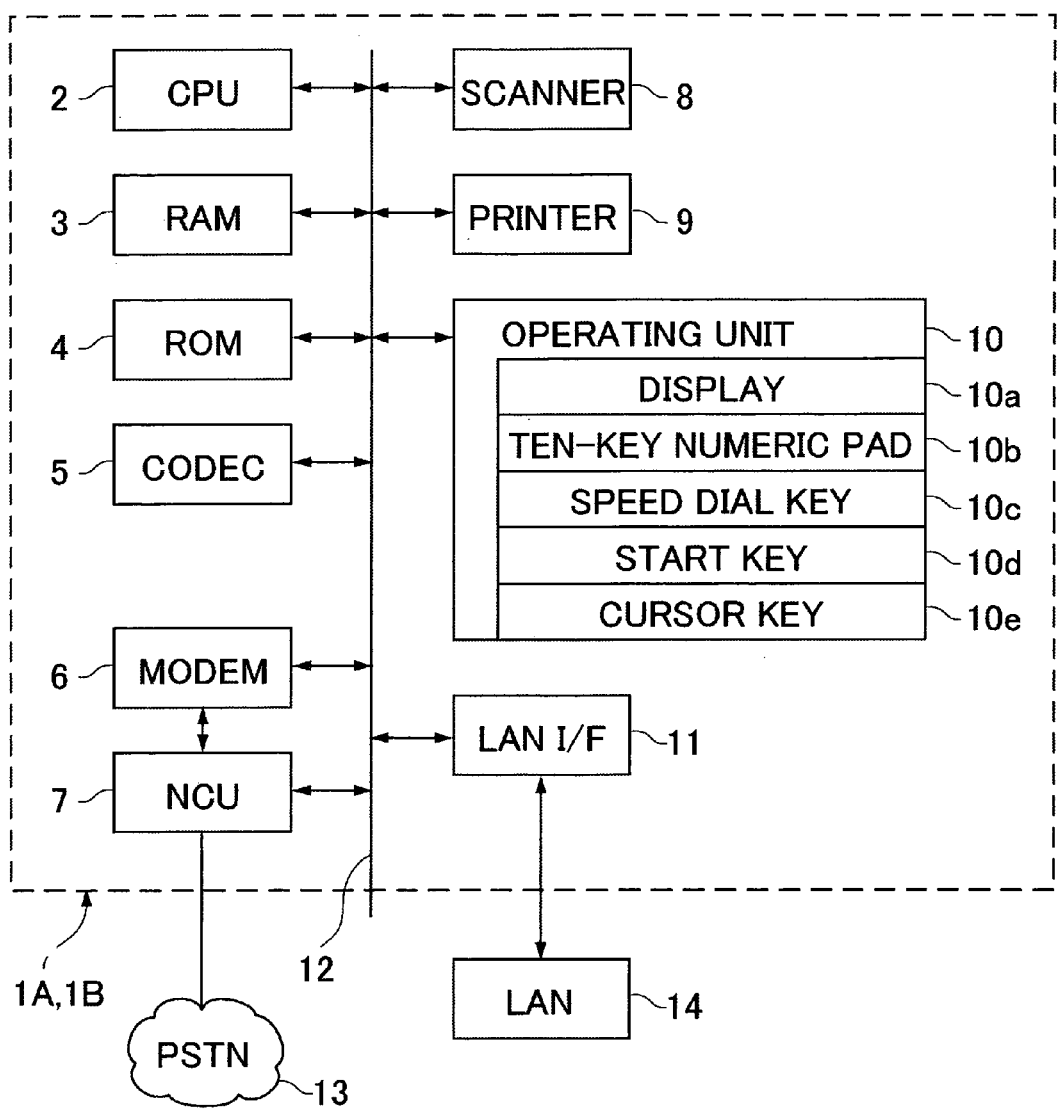
FIG. 1 is a block diagram showing an example of a structure of an Internet facsimile machine according to an embodiment of the present invention.

The Internet facsimile machine of the transmitting side and the Internet facsimile machine of the receiving side have the same structure, and the specific configuration is shown in FIG. 1. That is, each of the Internet facsimile machines 1A, 1B includes a CPU (Central Processing Unit) 2, a RAM (Random Access Memory) 3, a ROM (Read Only Memory) 4, a codec 5, a modem 6, an NCU (Network Control Unit) 7, a scanner 8, a printer 9, an operating unit 10, and a LAN I/F (Local Area Network Interface) 11. Each of the parts 2 through 11 are connected by a bus 12 in the manner a communication can be carried out.

The CPU 2 controls each of the devices composing the Internet facsimile machine 1A and the Internet facsimile machine 1B, in accordance with a prescribed program.

The RAM 3 functions as a storing unit for storing in advance, the image data, FAX numbers, e-mail address, data table to be described later on, and a communication record table or the like, or functions as a storing unit for storing various data or the like to be accumulated temporarily.

The ROM 4 stores, for example, various programs for controlling the operation of each part of the Internet facsimile machines 1A, 1B by the CPU 2, and program for converting a format of the image data.

The codec 5 encodes and decodes by adapting to a plurality of protocols. In other words, the codec 5 encodes the image data or the like scanned at the scanner 8 for transmission by MH (Modified Huffman), MR (Modified Read), MMR (Modified Modified Read) methods or the like, and decodes the received image data. Moreover, the codec 5 is also capable of encoding and decoding by adapting to TIFF (Tagged Image File Format), which is the image format generally used in computers. Further, the specification of the TIFF is publicized by the U.S. Adobe System.

The modem 6 carries out modulation and demodulation of the data to be transmitted and received in accordance with, for example, ITU-T (International Telecommunication Union-Telecommunications) Recommendation V.34 standard, or others similar to this standard.

The NCU 7 is a network control device for making a telephone call, or disconnecting by controlling a telephone line, and is connected to PSTN (Public Switched Telephone Network) 13.

The scanner 8 scans the image data of an original, and outputs the image data converted into a binary of black and white.

The printer 9 includes an electrophotographic method or the like, forms the received image data as an image onto a recording paper, and discharges the recording paper (prints out). For example, in accordance with the indication from the CPU 2, the printer 9 prints out the image data of the original scanned by the scanner 8, the image data received by a facsimile, the image data of an attached file or a text data of a main text that are received by the Internet facsimile.

The operating unit 10 includes, for example, a display 10a for displaying information concerning a condition of the Internet facsimile machines 1A, 1B, various operation instruction screen, and a communication record information or the like, a ten-key numeric pad 10b for inputting the FAX numbers, e-mail address or the like, speed dial keys 10c for calling from speed dial numbers, a start key 10d for starting scanning operation of the original and so forth, a cursor key 10e for transferring reversing display within the display 10a. Various operations are carried out from the operating unit 10.

The LAN I/F 11 includes an interface with LAN (Local Area Network) 14, and connects the LAN 14 and the Internet facsimile machines 1A, 1B in the manner the communication can be carried out.

The Internet facsimile machines 1A, 1B are provided with a function for transmitting and receiving by the facsimile, the image data of the original or the like by G3 method or the like. In addition, the Internet facsimile machines 1A, 1B are also provided with TCP/IP (Transmission Control Protocol/Internet Protocol) which is the Internet standard protocol, and an Internet facsimile function for transmitting and receiving the image data of the original or the like by the electronic mail. Further, for the image data to be transmitted and received by the electronic mail, the image data is formed in the TIFF format, made into a text in accordance with Base 64 or the like of MIME (Multipurpose Internet Mail Extensions), and is then attached to the electronic mail.

A data table T shown in FIG. 2 is stored in a prescribed storing area in the RAM 3 of the Internet facsimile machine of the transmitting side 1A. The data table T stores e-mail address (destination information) that are assigned and registered to each speed dial number by the operator, and the information concerning the destination machine that is memorized in association with the e-mail address. By describing in detail, the data table T includes "speed dial number" column, "name of destination" column, "e-mail address" column, and "receiving ability" column, and various information is stored in each of the columns per speed dial number that is registered in the "speed dial number" column. The information stored in each column can be edited freely by the operation of the operator from the operating unit 10 or a client PC that is to be described later on. Moreover, the content of the data table T can be printed out from the printer 9 by a predetermined operation at the operating unit 10, and the operator can obtain the printed matter for the receiving ability of the destination machine at any time.

In the "name of destination" column in the data table T, the information concerning the name of the destination, such as the name or the company name of the destination, is stored. The "name of destination" column in the data table T is referred to when transmitting from the speed dial number, and the name of the destination is displayed on the display 10a or the like. In the "e-mail address" column, the e-mail address as the destination information is stored, and when the speed dial number is designated at the transmission, the e-mail address stored in the "e-mail address" column is designated as the destination of the transmission.

In the "receiving ability" column, for example, the information concerning a resolution that can be received and processed by the destination machine is written after "dpi=", the information concerning the encoding method of the destination machine is written after "image-coding=", and the information concerning the printable recording paper size of the destination machine is written after "paper-size=".

Figure 3:
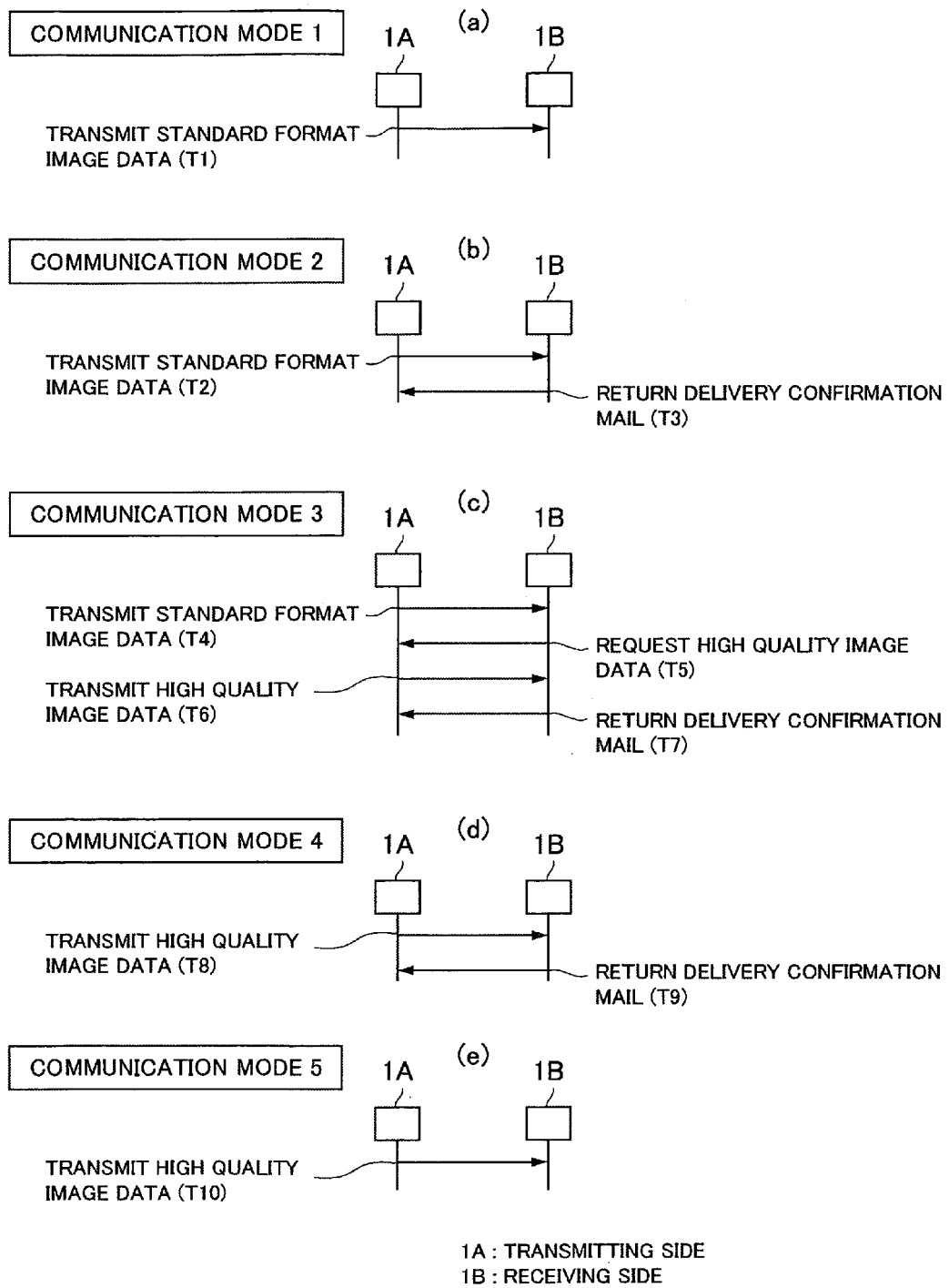
FIG. 3 is a view useful for explaining communication mode, and is a sequence diagram showing communication procedure to be carried out between the Internet facsimile machine of the transmitting side and the Internet facsimile machine of the receiving side.

Next, a communication mode to be adapted by the Internet facsimile machine of the transmitting side 1A will be described. As shown in FIG. 3, the Internet facsimile machine 1A adapts to five types of communication modes, from "communication mode 1" through "communication mode 5".

That is, as shown in FIG. 3(a), according to the "communication mode 1", the Internet facsimile machine of the transmitting side 1A carries out a normal Internet facsimile transmission (T1). In other words, the format of the original image data is converted to form the standard format image data (A4 as the recording paper size, MH method as the encoding method, 200 dpi as the resolution, etc.). Then, the electronic mail is formed that is attached with a standard format image data 18, as shown in FIG. 4(a), and the electronic mail is transmitted. At the time being, the original image data is deleted after the transmission of the standard format image data. Meanwhile, the Internet facsimile machine of the receiving side 1B that received the electronic mail carries out a normal receiving processing, such as printing out the received standard format image data.

As shown in FIG. 3(b), according to the "communication mode 2", the Internet facsimile machine of the transmitting side 1A converts the format of the original image data, and forms the standard format image data. Then, the Internet facsimile machine 1A forms the electronic mail, as shown in FIG. 4(b), that is written with a message 16 for requesting the return of the electronic mail for notifying a delivery confirmation (hereinafter referred to as the "delivery confirmation mail"), and that is attached with a formed standard format image data 15, and transmits the electronic mail (T2). Next, when the Internet facsimile machine of the receiving side 1B receives the electronic mail, the normal receiving processing such as printing is carried out, and also, in accordance with the message 16, the delivery confirmation mail is formed and returned to the Internet facsimile machine of the transmitting side 1A (T3). Further, in this patent specification, a function for returning the delivery confirmation mail after receiving the electronic mail that is written with the message 16 for requesting the return of the delivery confirmation mail will be referred to as the "delivery confirmation function".

Figure 5:
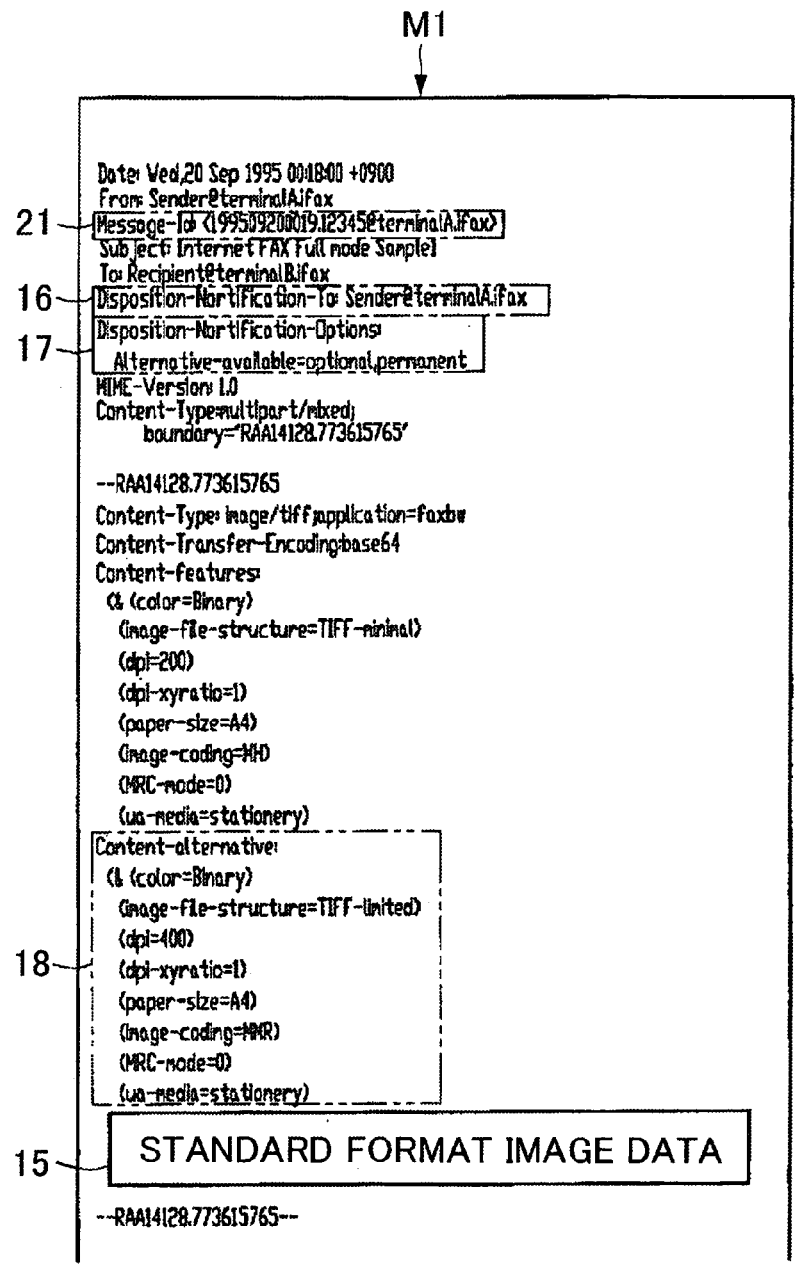
FIG. 5 is a view showing an example of electronic mail that is attached with the standard format image data, wherein the electronic mail includes message for requesting return of delivery confirmation mail, ability exchanging notification information, and format information of original image data.

As shown in FIG. 3(c), according to the "communication mode 3", the Internet facsimile machine of the transmitting side 1A converts the format of the original image data, and forms the standard format image data. Then, the Internet facsimile machine of the transmitting side 1A forms an electronic mail M1, as shown in FIG. 5, that is written with the message 16 for requesting the return of the delivery confirmation mail to the destination machine, an ability exchanging notification information 17 for notifying that the image data higher in its quality than the attached standard format image data will be transmitted when there is a prescribed request, and an information 18 concerning the format of the original image data (hereinafter referred to as the "original image data format information"). Then, a standard format image data 15 is attached to the electronic M1, and is transmitted (T4).

Figure 7:
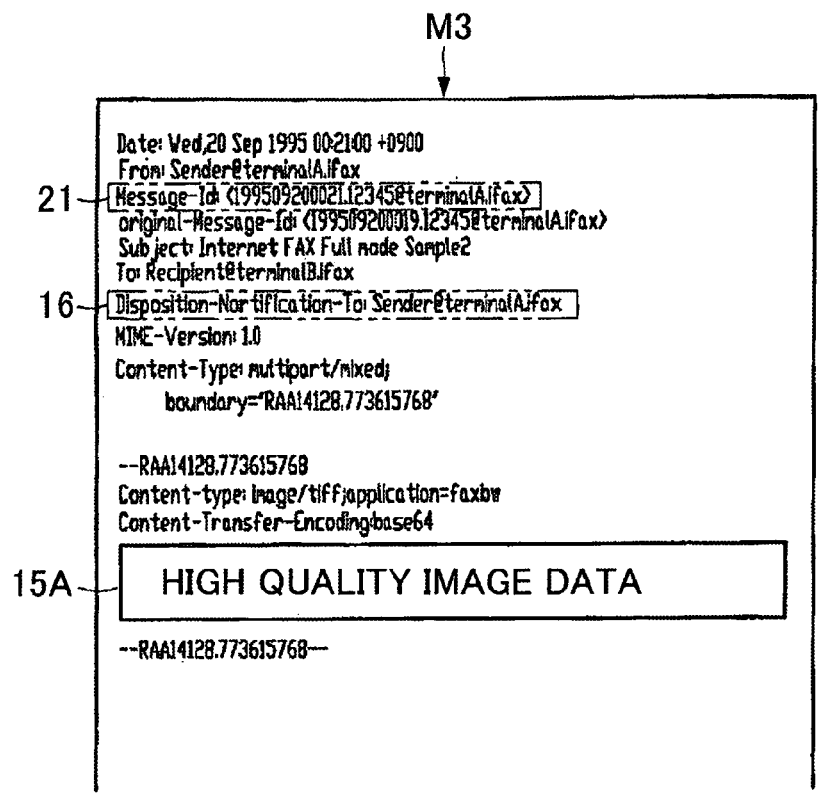
FIG. 7 is a view showing an example of electronic mail attached with the high quality image data that is transmitted by the Internet facsimile machine of the transmitting side in accordance with request from the Internet facsimile machine of the receiving side.
Figure 8:
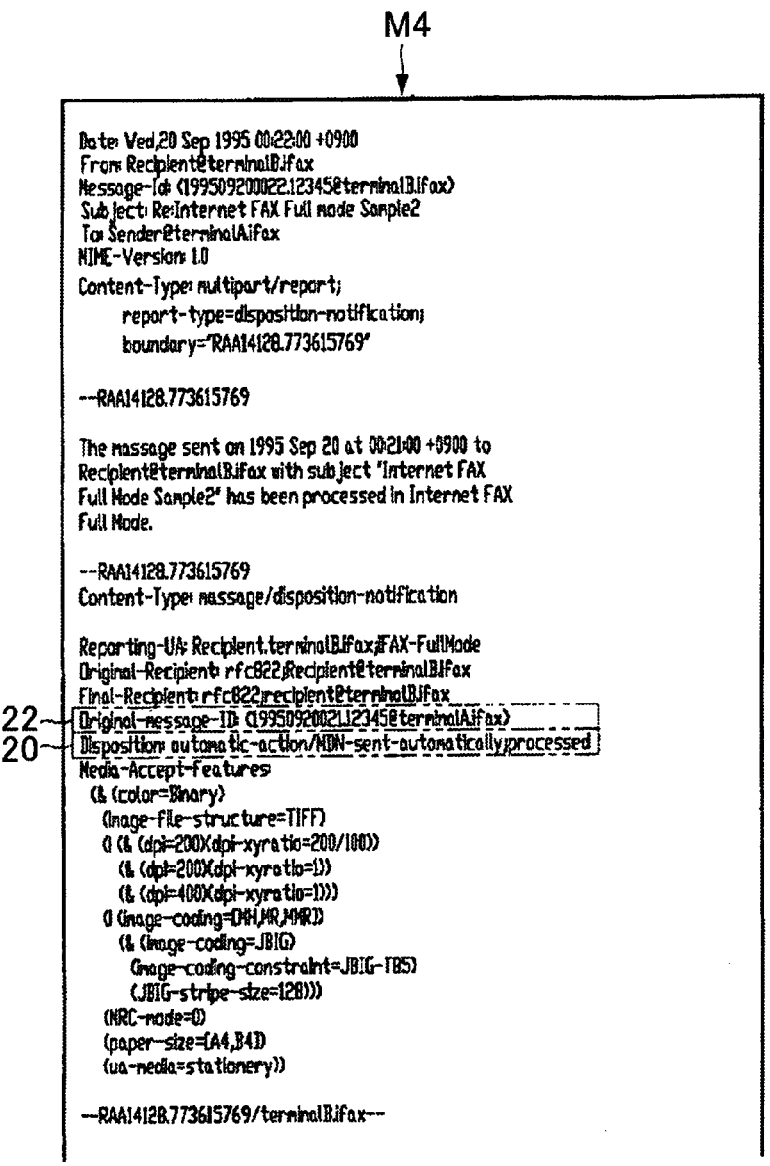
FIG. 8 is a view showing an example of delivery confirmation mail transmitted by the Internet facsimile machine of the receiving side in accordance with request from the Internet facsimile machine of the transmitting side.
Figure 11:
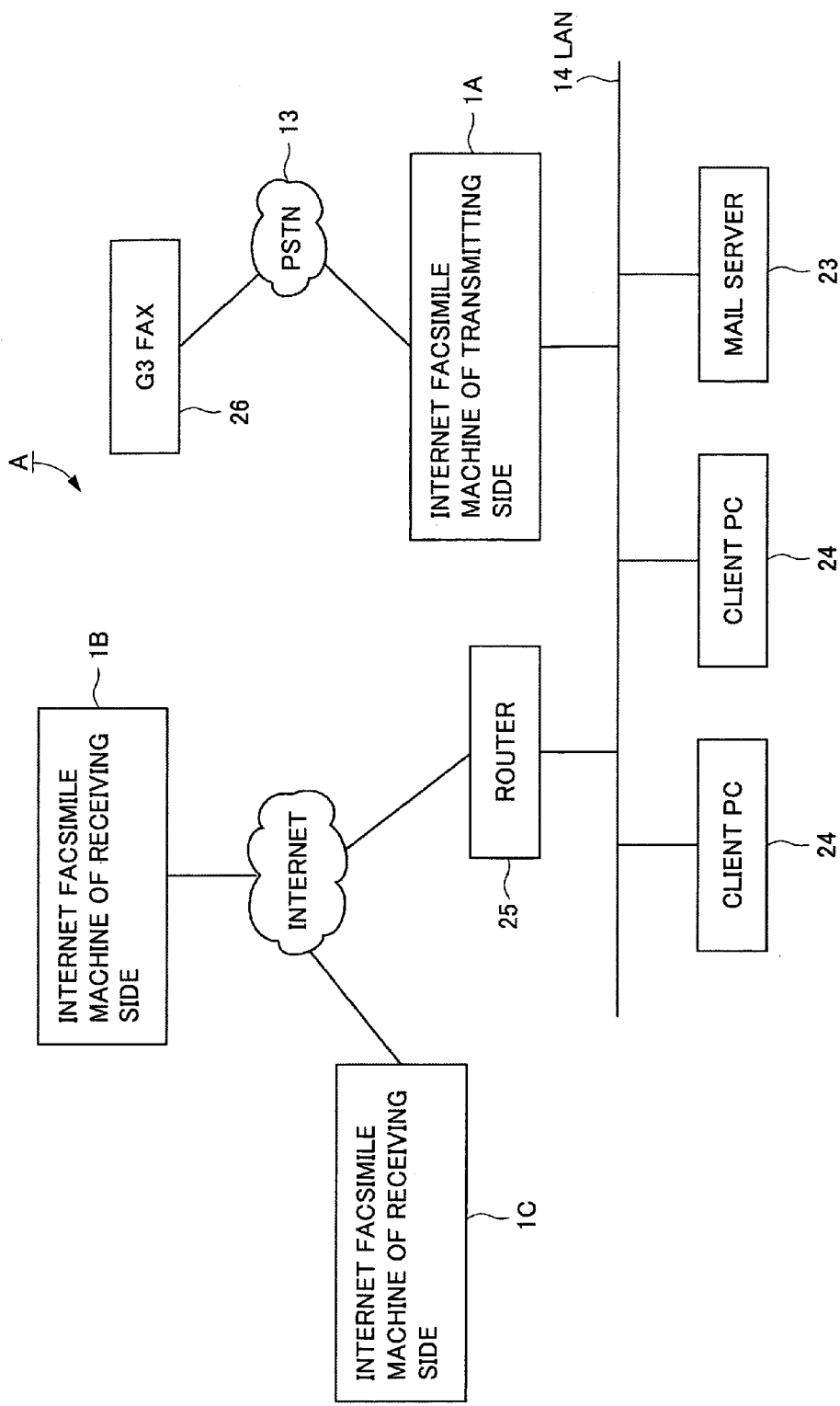
FIG. 11 is a block diagram showing an example of network environment that is provided with the Internet facsimile machine relating to an embodiment of the present invention.

Meanwhile, when receiving the electronic mail M1, the Internet facsimile machine of the receiving side 1B obtains the ability exchanging notification information 17 and the original image data format information 18 from the received electronic mail M1. Then, the Internet facsimile machine of the receiving side 1B forms the electronic mail M2, as shown in FIG. 6, that is written with the information 19 concerning the receiving ability of the Internet facsimile machine 1B (hereinafter referred to as the "receiving ability information"), and returns the electronic mail M2 to the Internet facsimile machine of the transmitting side 1A (T5). Then, when receiving the electronic mail M2, the Internet facsimile machine of the transmitting side 1A forms the image data in the format corresponding to the receiving ability of the Internet facsimile machine of the receiving side 1B (hereinafter referred to as the "high quality image data"), by converting the format of the original image data in accordance with the receiving ability information 19. In addition, the Internet facsimile machine 1A forms an electronic mail M3, as shown in FIG. 7, that is attached with the high quality image data 15A, wherein the electronic mail is written with the message 16 for requesting the return of the delivery confirmation mail to the destination machine, and then the electronic mail M3 is transmitted to the Internet facsimile machine of the receiving side 1B (T6). Lastly, when receiving the electronic mail M3, the Internet facsimile machine of the receiving side 1B forms an electronic mail M4, as shown in FIG. 8, wherein the electronic mail includes a delivery confirmation message 20, and an original message ID column 22 that is written with the message ID designated in the message ID column 21 of the received electronic mail M3. Then, the electronic mail M4 is returned to the Internet facsimile machine of the transmitting side 1A (T7). Further, in this patent specification, a function for dealing with a series of the communication procedure of T4 through T7 that are carried out between the Internet facsimile machine of the transmitting side 1A and the Internet facsimile machine of the receiving side 1B will be referred to as the "ability exchanging function".

As shown in FIG. 3(*d*), according to the "communication mode 4", the Internet facsimile machine of the transmitting side 1A forms the image data higher in its quality than the standard format image data, attaches the formed high quality image data 15A to the electronic mail, as shown in FIG. 4(*b*), that is written with the message 16 for requesting the return of the delivery confirmation mail, and then transmits the electronic mail (T8). Next, when receiving the electronic mail, the Internet facsimile machine of the receiving side 1B carries out the normal receiving processing such as printing of the received high quality image data 15A, and also, in accordance with the message 16, forms the delivery confirmation mail, and returns to the Internet facsimile machine of the transmitting side 1A (T9).

As shown in FIG. 3(*e*), according to the "communication mode 5", the Internet facsimile machine of the transmitting side 1A forms the image data higher in its quality than the standard format image data, and forms the electronic mail, as shown in FIG. 4(*a*), not including the message 16 for requesting the return of the delivery confirmation mail. Then, the formed high quality image data 15A is attached to the electronic mail, and the electronic mail is transmitted (T10). Meanwhile, the Internet facsimile machine of the receiving side 1B that receives the electronic mail carries out the normal receiving processing such as printing out the received high quality image data 15A.

Next, a communication management recording function provided in the Internet facsimile machine of the transmitting side 1A will be described. A communication record table 28, as shown in FIG. 9, is stored in a prescribed storing field in the RAM 3 of the Internet facsimile machine of the transmitting side 1A. The communication record table 28 includes a transmission record table 28*a* for storing the information for the transmission record, and a reception record table 28*b* for storing the information for the reception record. The transmission record information, and the reception record information are memorized by being stored into these tables 28*a*, 28*b*, and by outputting the communication record to the display 10*a*, the printer 9, or other outside terminals or the like by following the operation indication from outside such as the operating unit 10, the content of the communication record is displayed or printed out. By describing the specific content of the communication record information stored in the tables 28*a*, 28*b*, the transmission record table 28*a* includes, for example, "ability exchanging function" column, "destination" column, "date and time" column, "subject" column, and "result" column. Each time the Internet facsimile machine of the transmitting side 1A carries out the transmission or the receiving, the communication record information is stored into the transmission record table 28*a* or the reception record table 28*b*.

The "ability exchanging function" column stores the information including a communication identifying information 45 for identifying a series of electronic mails transmitted and received when transmitting by using the ability exchanging function from other series of electronic mails, and a communication procedure information 46 for specifying each electronic mail in the series of electronic mails. According to the present embodiment, for example, "1", "2", "3", etc. are stored as the communication identifying information 45, and "transmission 1", "receiving 1", "transmission 2", "receiving 2" are stored as the communication procedure information 46. Therefore, for example, "1-transmission 1", "2-transmission 1", etc. are the communication record for the transmission of the standard format image data described in accordance with FIG. 3 (T4: hereinafter referred to as "first transmission"), "1-receiving 1", "2-receiving 1", etc. are the communication recording for the receiving of the request mail for the high quality image data (T5: hereinafter referred to as "first receiving"), "1-transmission 2", "2-transmission 2", etc. are the communication record for the transmission of the high quality image data (T6: hereinafter referred to as "second transmission"), and "1-receiving 2", "2-receiving 2", etc. are the communication record for the receiving of the delivery confirmation mail (T7: hereinafter referred to as "second receiving").

The "destination" column stores the e-mail address (destination information) of the destination, and the "origin" column stores the e-mail address (destination information) of the origin. The "date and time" column stores the information of date and time of the transmission or the receiving.

The "subject" column stores the information that is written in "Subject:" column of the mail header of the transmitted or received electronic mail. In the "result" column, "completed", "error", etc. are stored as the information indicating whether the image data is received and processed normally at the destination, or "during communication", etc. are stored as the information indicating that the processing result is yet to be determined.

The Internet facsimile machine of the transmitting side 1A and the Internet facsimile machine of the receiving side 1B having the abovementioned structure and various function are used by being provided in, for example, a network environment (A) as shown in FIG. 1. In other words, the Internet facsimile machine of the transmitting side 1A is connected reciprocally to a mail server 23, a client PC 24 that is under command of the Internet facsimile machine of the transmitting side 1A, a router 25 or the like through the LAN 14 in the manner the communication can be carried out. Moreover, the Internet facsimile machine of the transmitting side 1A is capable of carrying out the communication through the Internet with the Internet facsimile machine of the receiving side 1B having the ability exchanging function, and the Internet facsimile machine 1C not having the ability exchanging function. In addition, the Internet facsimile machine 1A is also capable of transmitting and receiving the image data of G3 format with other G3 FAX terminal 26 through the PSTN 13.

Next, the operation of the Internet facsimile machine of the transmitting side 1A that is provided in the network environment (A), of when transmitting the image data formed by the original being scanned from the scanner 8, or the image data received from the client PC 24 for the facsimile transmission, will be described in accordance with the flow charts shown in FIG. 12 and FIG. 13. Further, the operation to be described in accordance with the flow charts is carried out following the command generated by the CPU 2 in accordance with the control program or the like that is stored in the ROM 4 of the Internet facsimile machine of the transmitting side 1A.

Figure 12:
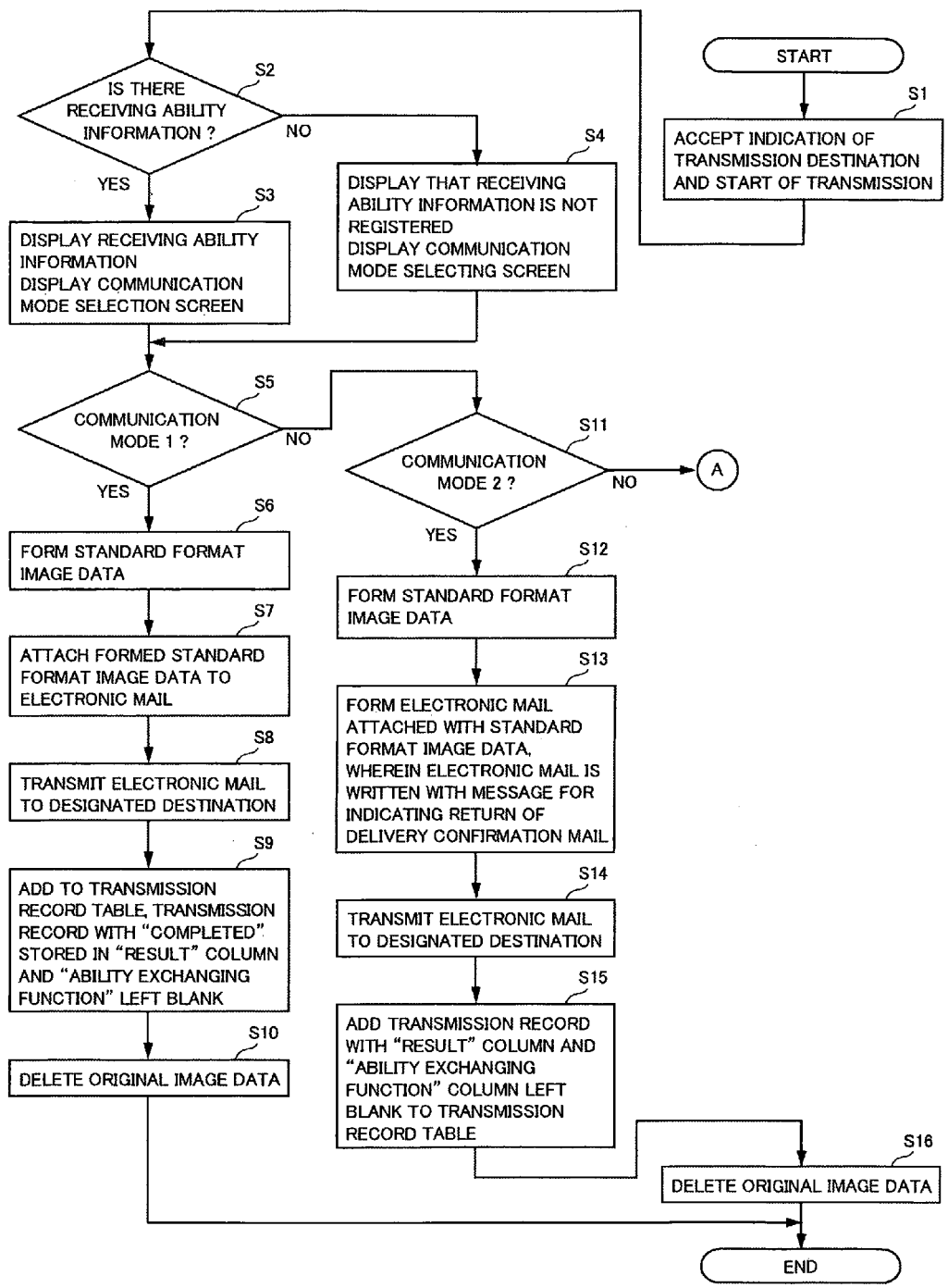
FIG. 12 is a flow chart showing operation of when the Internet facsimile machine of the transmitting side transmits the image data.
Figure 13:
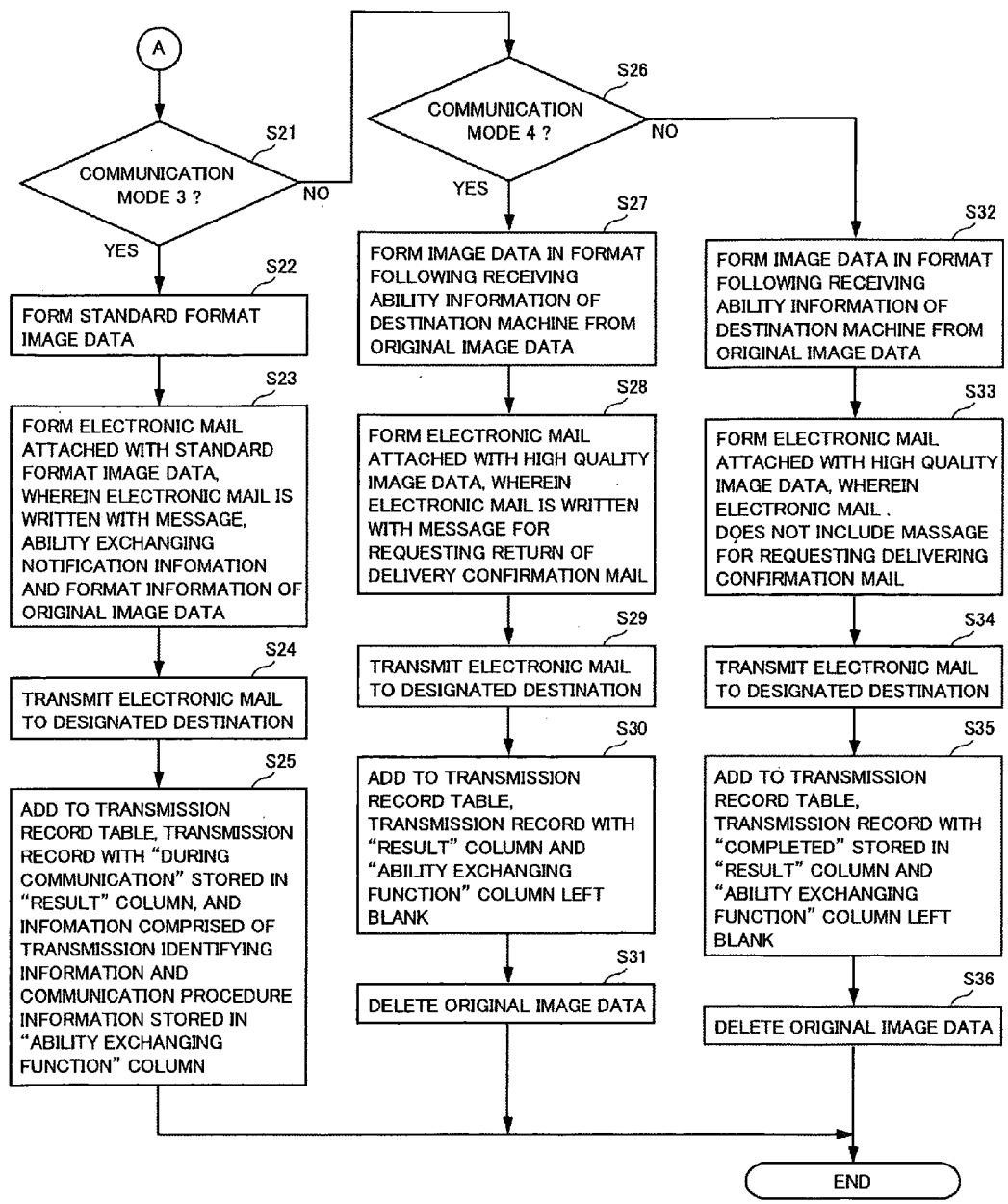
FIG. 13 is a flow chart showing operation of when the Internet facsimile machine of the transmitting side transmits the image data.

First, when the indication for the transmission destination and the start of the transmission of the image data is carried out by the operation from the operating unit 10 or the client PC 24 by the operator, as shown in the flow chart of FIG. 12, the Internet facsimile machine of the transmitting side 1A accepts the indication (S1). Next, it is determined whether or not the receiving ability information of the destination machine is stored in the "receiving ability" column in the data table T (FIG. 2) (S2). In the case the receiving ability information is stored, a communication mode selecting screen 27a as shown in FIG. 14(*a*) is displayed on the display 10a, for displaying the receiving ability information and for selecting the communication mode by the cursor key 10e or the like, or the screen information is transmitted to the client PC 24 (S3). On the other hand, in the case it is determined in S2 that the receiving ability information of the destination machine is not stored, a communication mode selecting screen 27b as shown in FIG. 14(*b*) is displayed on the display 10b, for displaying that the receiving ability information of the designated destination machine is not registered and for selecting the communication mode, or the screen information is transmitted to the client PC 24 (S4).

Next, when the communication mode is selected by the operator from the displayed communication mode selecting screen 27a in S3 or from the displayed communication mode selecting screen 27b in S4, in the case the selected communication mode is the "communication mode 1" (S5), the Internet facsimile machine of the transmitting side 1A forms the standard format image data from the original image data (S6). Then, the standard format image data is attached to the electronic mail (S7), the electronic mail is transmitted to the designated destination (S8), a new transmission record information is added to the transmission record table 28a (S9), and lastly, the original image data being held is deleted (S10). For the addition of a new transmission record information in S9, for example, as shown in a transmission record 104 in FIG. 9, the e-mail address "test@test.co.jp" which was the destination, is stored in the "destination" column, the transmission date and time information "03/01 14:03" is stored in the "date and time" column, the information "test document" written in the "Subject:" column in the mail header of the transmitted electronic mail is stored in the "subject" column, and "completed" as information showing the completion of the transmission is stored in the "result" column. The "ability exchanging function" column is to be kept blank since the transmission was carried out under the "communication mode 1", that is, without using the ability exchanging function.

In the case the communication mode selected from the communication mode selecting screens 27a, 27b is the "communication mode 2" (S11), the standard format image data is formed from the original image data (S12), and the electronic mail, as shown in FIG. 4(*b*), is formed that is attached with the standard format image data 15 formed in S12, wherein the electronic mail is written with the message 16 for requesting the return of the delivery confirmation mail (S13). Then, the electronic mail is transmitted to the designated destination (S14), a new transmission record is added to the transmission record table 28a (S15), and lastly, the original image data being held is deleted (S16). For the addition of the new transmission record information in S15, for example, as shown in a transmission record 105 in FIG. 9, the "result" column is to be kept blank, the "ability exchanging function" column is also to be kept blank since the transmission was carried out under the "communication mode 1", in other words, without using the ability exchanging function, and for the "destination" column, the "date and time" column, and the "subject" column, various information is stored as in the manner as in S9.

In the case the communication mode selected from the communication mode selecting screens 27a, 27b is the "communication mode 3" (S21), the standard format image data is formed from the original image data (S22). Then, the electronic mail M1, as shown in FIG. 5, is formed wherein the standard format image data 15 formed in S22 is attached to the electronic mail that is written with the message 16 for requesting the return of the delivery confirmation mail, the ability exchanging notification information 17, and the format information 18 of the original image data (S23). The formed electronic mail M1 is transmitted to the designated destination (S24), and a new transmission record is added to the transmission record table 28a (S25). For the addition of the new transmission record, for example, as shown in the transmission record 103 in FIG. 9, "during communication" is stored in the "result" column as the information indicating that it is during the communication, "2-transmission 1" is stored in the "ability exchanging function" column as the information including the abovementioned communication identifying information 45 and the communication procedure information 46, and for the "destination" column, the "date and time" column, and the "subject" column, various information is stored as in the manner as in S9.

In the case the communication mode selected from the communication selecting screens 27a, 27b is the "communication mode 4" (S26), the image data (high quality image data) in the format following the receiving ability information of the destination machine is formed from the original image data (S27). Then, the electronic mail as shown in FIG. 4(b) is formed that is attached with the high quality image data 15A formed in S27, wherein the electronic mail is written with the message 16 for requesting the return of the delivery confirmation mail (S28), the electronic mail is transmitted to the designated destination (S29), a new transmission record is added to the transmission record table 28a (S30), and the original image data being held is deleted (S31). For the addition of the new transmission record in S30, for example, as shown in the communication record 105 in FIG. 9, the "result" column is to be kept blank, the "ability exchanging function" column is also to be kept blank since the transmission was carried out without using the ability exchanging function, and for the "destination" column, the "date and time" column, and the "subject" column, various information is stored as in the manner as in S9.

In the case the communication mode selected from the communication mode selecting screens 27a, 27b is not any one of the "communication mode 1 through 4", in other words, in the case of the "communication mode 5" (S26), the image data (high quality image data) in the format following the receiving ability information of the destination machine is formed from the original image data (S32). Then, the electronic mail as shown in FIG. 4(a) is formed that is attached with the high quality image data 15A formed in S32, wherein the electronic mail does not include the message 16 for requesting the return of the delivery confirmation mail (S33). Consequently, the electronic mail is transmitted to the designated destination (S34), a new communication record is added to the transmission record table 28a (S35), and lastly, the original image data being held is deleted (S36). For the addition of the new transmission record information in S35, for example, as shown in the transmission record 104 in FIG. 9, "completed" is stored in the "result" column as the information indicating the completion of the transmission, the "ability exchanging function" column is to be kept blank since the transmission was carried out under the "communication mode 5", in other words, without using the ability exchanging function, and for the "destination" column, the "date and time" column, and the "subject" column, various information is stored as in the manner as in S9.

Next, the operation of when receiving the electronic mail by the Internet facsimile machine of the receiving side 1B that is provided with the ability exchanging function capable of dealing with any one of the "communication modes 1 through 5", will be described in accordance with the flow chart shown in FIG. 15. Further, the operation to be described in accordance with the flow chart is carried out by following the command that is generated by the CPU 2 in accordance with the control program or the like that is stored in the ROM 4 of the Internet facsimile machine of the receiving side 1B.

When the Internet facsimile machine of the receiving side 1B receives the electronic mail, and as a result of analyzing the content of the electronic mail, in the case the received electronic mail is the Internet facsimile (S51), it is determined whether or not the received electronic mail includes the message 16 for requesting the return of the delivery confirmation mail as shown in the electronic mail M1 in FIG. 5 (S52). In the case it is determined that the message 16 is not included in the received electronic mail, the communication is assumed to be the "communication mode 1" or the "communication mode 5", and the normal processing is carried out such as printing and distributing of the received image data (S53).

In the case it is determined in S52 that the message 16 is included in the received electronic mail, it is determined next whether or not the received electronic mail includes the ability exchanging notification information 17 and the original image data format information 18 as shown in the electronic mail M1 of FIG. 5 (S54). In the case it is determined that the ability exchanging notification information 17 and the original image data format information 18 are included in the received electronic mail, the communication is assumed to be the "communication mode 3", and then, it is determined whether or not the image data is in the format that can be analyzed (S55). In the case the image data is in the format that can be analyzed, the electronic mail M2 as shown in FIG. 6 is formed for requesting the image data higher in its quality than the standard format (S56), and the formed electronic mail is returned (S57).

By describing the content of the electronic mail M2 in detail, the e-mail address of the Internet facsimile machine of the transmitting side 1A is written in a destination designation column 29 in the mail header, an information 30 comprehensible by man is written in the main text column, and a machine scanning information 31 for the Internet facsimile machine of the transmitting side 1A is also written in the main text column. The machine scanning information 31 includes the original message ID column 22 that is written with the message ID designated in the message ID column 21 of the electronic mail M1 or the like that is received in advance, and the receiving ability information 19 of the Internet facsimile machine of the receiving side 1B. Therefore, when receiving the electronic mail M2, the Internet facsimile machine of the transmitting side 1A determines that the received electronic mail M2 is the response to the electronic mail M1 that is transmitted in advance, in accordance with the original message ID written in the original message ID column 22. Then, the transmission is carried out under the "communication mode 3".

Meanwhile, in the case it is determined in S55 that the image data is in the format that cannot be analyzed, or in the case the image data cannot be processed, the Internet facsimile machine of the receiving side 1B forms the electronic mail that is written with a comprehensible error message (S58), and the electronic mail is returned to the Internet facsimile machine of the transmitting side 1A (S59).

In the case it is determined in S54 that there is no ability exchanging notification information 17, the communication is to be assumed to be either the "communication mode 2" or the "communication mode 4", and the delivery confirmation mail is to be formed. Then, the Internet facsimile machine of the receiving side 1B returns the delivery confirmation mail to the Internet facsimile machine of the transmitting side 1A (S60).

Next, the operation of when the Internet facsimile machine of the transmitting side 1A receives the electronic mail that is transmitted by the Internet facsimile machine of the receiving side 1B in S59 or S60 will be described in accordance with the flow chart shown in FIG. 16. Further, the operation to be described in accordance with the flow chart is also carried out by following the command that is generated by the CPU 2 in accordance with the control program or the like that is stored in the ROM 4 of the Internet facsimile machine of the transmitting side 1A. Moreover, the communication record table 28 shown in FIG. 10 to be cited later on, will be described as formed from the communication record table shown in FIG. 9 when a prescribed period of time elapses.

When the Internet facsimile machine of the transmitting side 1A receives the electronic mail, and as a result of analyzing the content of the received electronic mail, in the case the received electronic mail is the Internet facsimile (S151), it is determined whether or not the received electronic mail is the response to the electronic mail M1 that is transmitted in advance, in accordance with whether or not the original message ID of the electronic mail M1 transmitted in advance is included in the original message ID column 22, as shown in the electronic mail M2 in FIG. 6 (S152). In the case the original message ID is included, it is determined whether or not the received electronic mail is the electronic mail for notifying the error for the electronic mail transmitted in advance (hereinafter referred to as the "error mail"), in accordance with the presence or the absence of a prescribed writing (S153). In the case it is determined that there is a prescribed writing for notifying the error, the transmission record of the electronic mail transmitted in advance is searched from the original message ID, and for example, as shown in the transmission record 107 in FIG. 10, "error" is stored to the "result" column (S154). Further, in S153, by receiving the error mail as the response for the electronic mail transmitted in advance, it is determined that the electronic mail was not received by the destination machine normally. However, the determination is not to be limited for only the error mail, and when the error is detected under other methods, "error" can be stored in the "result" column as in the same manner.

Meanwhile, in the case it is determined in S153 that there is no prescribed writing for notifying the error, next, it is determined whether or not the receiving ability information 19 is included in the machine scanning information 31 (S155).

When it is determined in S155 that the receiving ability information 19 is included, the receiving ability information 19 is obtained (S156), and the image data (high quality image data) in the format following the receiving ability information 19 is formed from the original image data (S157). Then, the electronic mail, similar to the electronic mail M3 shown in FIG. 7, is formed that is attached with the high quality image data 18A, wherein the electronic mail includes the message 16 for requesting the return of the delivery confirmation mail (S158), and the electronic mail is transmitted to the Internet facsimile machine of the receiving side 1B (S159). Then, the new transmission record is added to the transmission record table 28a (S160), wherein as shown in the transmission record 106 in FIG. 9 as an example, "during communication" is stored in the "result" column, "1-transmission 2", etc. is stored in the "ability exchanging function" column as the information including the communication identifying information 45 and the communication procedure information 46, and for the "destination" column, the "date and time" column, and the "subject" column, various information is stored as in the same manner as in S9 or the like. Then, for example, as from the transmission record 103 shown in FIG. 9 to the transmission record 103 shown in FIG. 10, "during communication" stored in the "result" column of the transmission record for the first transmission is changed to "completed" (S161). Furthermore, a new reception record for the receiving in S151 is added to the reception record table 28b (S161), wherein "completed" is stored in the "result" column, and "2-receiving 1", etc. is stored in the "ability exchanging function" column as the information including the communication identifying information 45 and the communication procedure information 46, as in the reception record 122 shown in FIG. 10 as an example. Lastly, the original image data being held is deleted (S163).

Meanwhile, in the case it is determined in S152 that the abovementioned original message ID is not included, printing and other processing is carried out, with the received electronic mail being assumed as the normal electronic mail (S164), and a new reception record is added to the reception record table 28b (S165). For the addition of the new reception record, as shown in the reception record 122 in FIG. 9, "completed" is stored in the "result" column as the information indicating the completion of the receiving, the "ability exchanging function" column is to be kept blank as the receiving does not relate to the transmission by the ability exchanging function, and for the "origin" column, the "date and time" column, and the "subject" column, various information is to be stored as in the same manner as in S9.

Meanwhile, in the case it is determined in S155 that the receiving ability information 19 is not included, it is determined whether or not the received electronic mail is the delivery confirmation mail (second receiving) as the response to the electronic mail attached with the high quality image data transmitted in advance (second transmission), in accordance with whether or not the message ID of the electronic mail transmitted in advance is included in the original message ID column 22 (S166). In the case it is determined that the received electronic mail is the delivery confirmation mail as the response to the electronic mail transmitted in advance, a new reception record as shown in a reception record 125 in FIG. 10 as an example, is added, wherein "completed" is stored in the "result" column, and "1-receiving 2", etc. which is the information including the communication identifying information 45 and the communication procedure information 46 is stored in the "ability exchanging function" column (S167). Then, for example, as from the transmission record 106 shown in FIG. 9 to the transmission record 106 shown in FIG. 10, "during communication" stored in the "result" column in the transmission record for the second transmission is changed to "completed" (S168).

Meanwhile, in the case it is determined in S166 that the received electronic mail is not the delivery confirmation mail as the response to the electronic mail transmitted in advance and is the delivery confirmation mail not relating to the transmission using the ability exchanging function, a new reception record as shown in the reception record 126 in FIG. 10 as an example, is added to the reception record table 28b, wherein "completed" is stored to the "result" column, and the "ability exchanging function" column is kept blank (S169). Then, for example, as from the transmission record 105 shown in FIG. 9 to the transmission record 105 shown in FIG. 10, "completed" is stored to the "result" column in the transmission record for the electronic mail transmitted in advance (S170).

Figure 15:
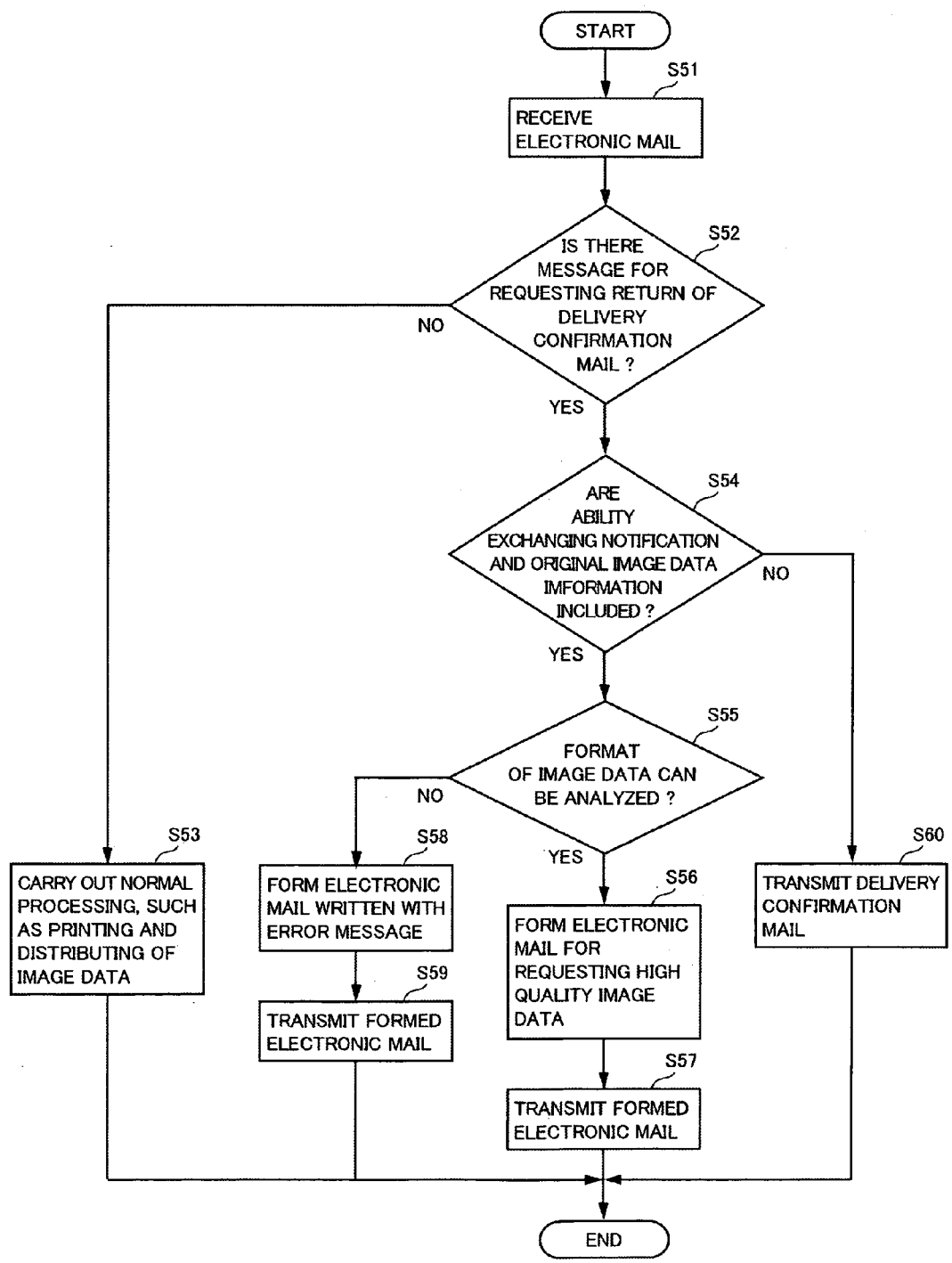
FIG. 15 is a flow chart showing operation of when the Internet facsimile machine of the receiving side receives the electronic mail.

When the electronic mail M3 transmitted in S159 is received by the Internet facsimile machine of the receiving side 1B, the Internet facsimile machine of the receiving side 1B operates according to the command generated by the CPU 2 in accordance with the control program or the like stored in the ROM 4, by following the flow chart shown in FIG. 15. That is, when receiving the electronic mail M3 that is written with the message 16 for requesting the return of the delivery confirmation mail, and not written with the ability exchanging notification information 17 (S51), it is determined that there is the message 16 (S52), and it is determined that the ability exchanging notification information 17 is not included in the electronic mail (S54). Lastly, the delivery confirmation mail (electronic mail) M4 is returned to the Internet facsimile machine of the transmitting side 1A (S60), wherein the electronic mail M4 includes the original message ID column 22 that is written with the message ID of the received electronic mail M3, and the processing completion message 20 that indicates the fact that the electronic mail M3 is received and processed.

Figure 16:
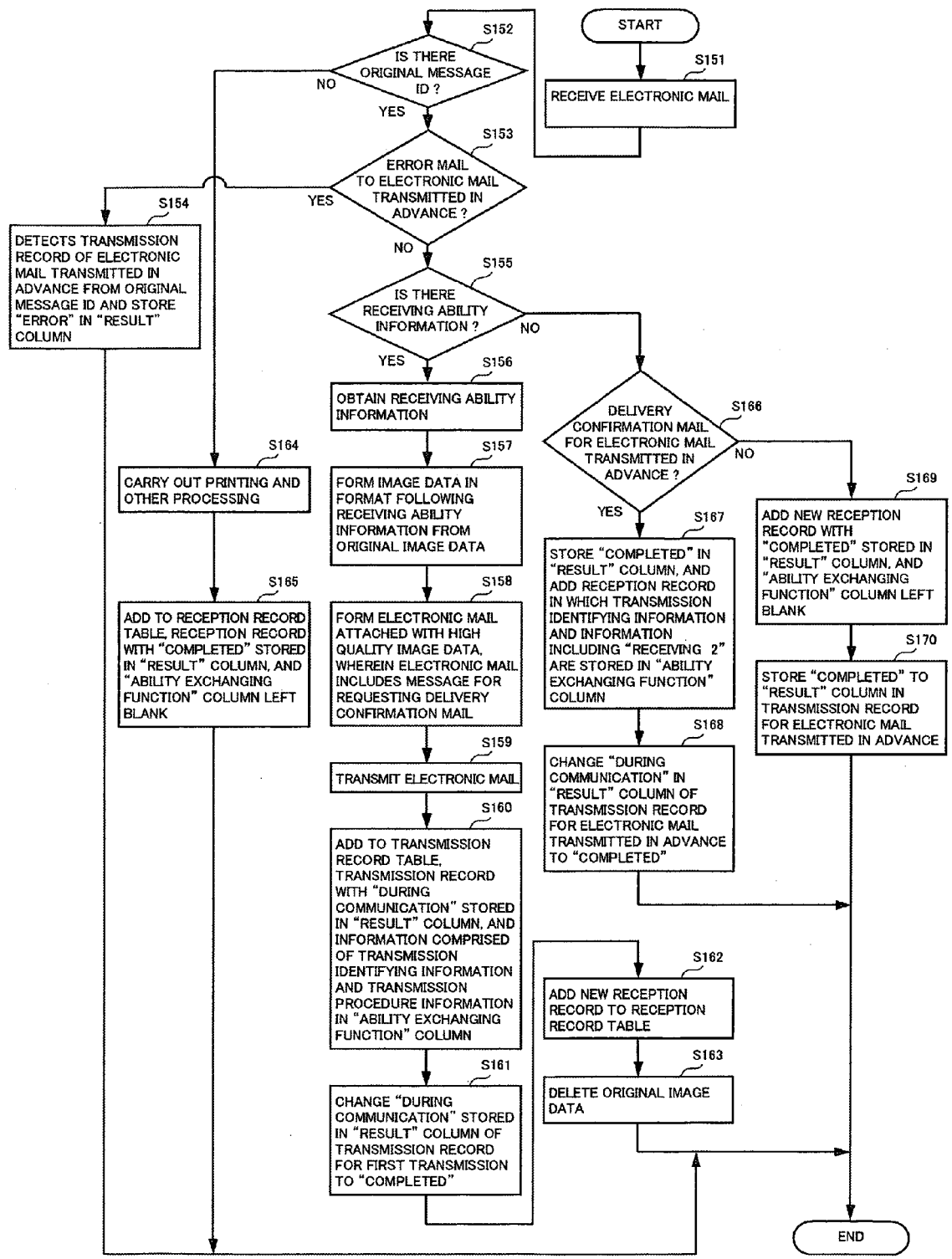
FIG. 16 is a flow chart showing operation of when the Internet facsimile machine of the transmitting side receives the electronic mail.

Meanwhile, the Internet facsimile machine of the transmitting side 1A that received the return of the delivery confirmation mail M4 operates by following the flow chart shown in FIG. 16. That is, the delivery confirmation mail M4 is received (S151), and since there is the original message ID written in the original message ID column 22 of the delivery confirmation mail M4, it proceeds to S155, and since the receiving ability information is not written, it proceeds to S166. Then, the delivery confirmation mail M4 is determined to be the response to the electronic mail M3 transmitted in advance from the original message ID, and the information that the high quality image data is received and processed by the Internet facsimile machine of the receiving side 1B is obtained from the processing completion message 20 of the delivery confirmation mail M4. Consequently, the reception record of the second receiving, as the reception record 125 shown in FIG. 10 as an example, is added to the reception record table 28b (S167). Then, in the "result" column in the transmission record 106 for the second transmission, "completed" is stored (S168).

Figure 17:
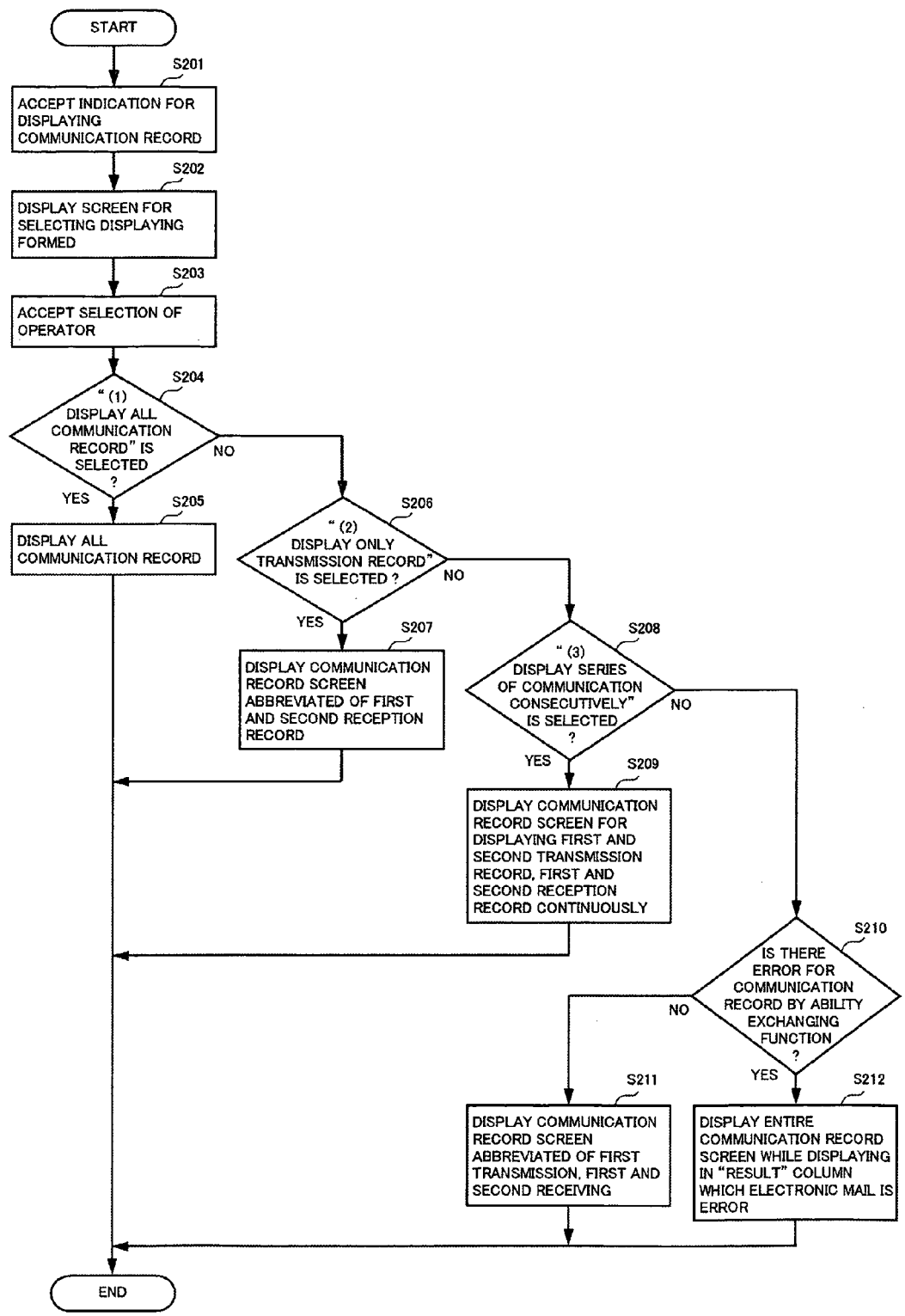
FIG. 17 is a flow chart showing operation of the Internet facsimile machine of the transmitting side of when displaying the communication record screen.
Figure 18:
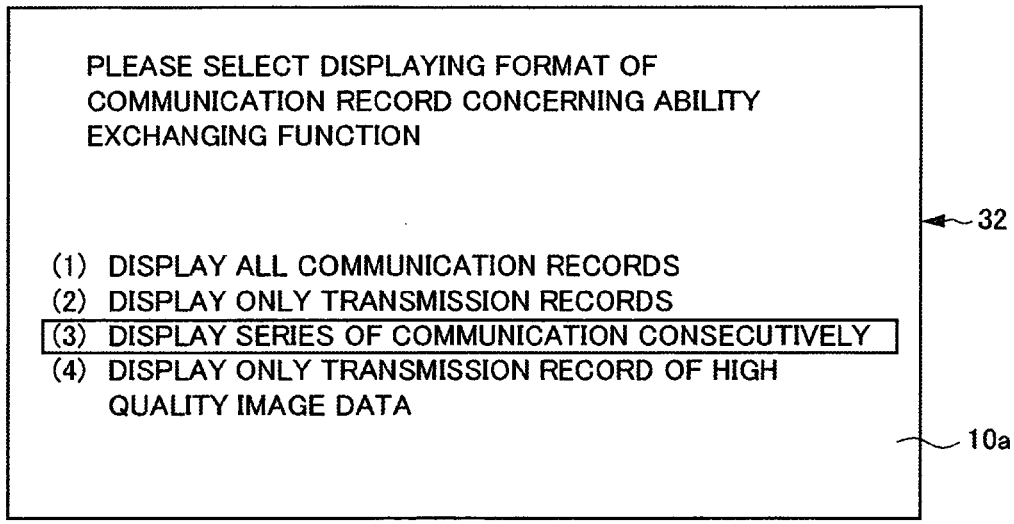
FIG. 18 is a view showing an example of displaying format selecting screen.

Next, in accordance with the flow chart shown in FIG. 17, it will be described of the operation of the Internet facsimile machine of the transmitting side 1A, when the content of the communication record table 28, as shown in FIG. 10 that is formed by the communication being carried out in the abovementioned manner, is displayed on the display 10a or the displaying device of the client PC 24 by the content of the table 28 being output by the prescribed operation of the operator from the operating unit 10 or the like. In the following description, the communication record is output on the display 10a or the displaying device of the client PC 24, however, the output destination is not to be limited to these displaying devices or the like, and for example, the communication record can be output to the printer 9 and the content of the communication record can be shown on paper. Further, the operation to be described in accordance with the flow chart shown in FIG. 17, is also carried out by following the command generated by the CPU 2 in accordance with the control program or the like being stored in the ROM 4 of the Internet facsimile machine of the transmitting side 1A.

First, when the operator carries out a prescribed operation for displaying the communication record from the operating unit 10 or the client PC 24, the Internet facsimile machine of the transmitting side 1A accepts the indication (S201), the displaying format selecting screen 32 is displayed on the display 10a for selecting the displaying format of the communication record of the series of the electronic mails transmitted and received at the transmission of the image data by the ability exchanging function, or the screen information is transmitted to the client PC 24 (S202), and the screen 32 is displayed on the displaying device of the client PC 24.

The displaying format selecting screen 32 includes four choices of "(1) display all communication records", "(2) display only transmission record", "(3) display series of communication record consecutively", and "(4) display only transmission record of high quality image data". The operator selects either choice by using the cursor key 10e or the like. When one choice is selected by the operator, the Internet facsimile machine of the transmitting side 1A accepts the selection (S203), and the communication record information is displayed on the display 10a under the selected displaying format, or the screen information is transmitted to the client PC 24.

The screen of the communication record to be output is in the displaying format of the transmission (communication) record screens 33, 35, 37, 39 and the receiving (communication) record screens 34, 36, 38, 40 as shown in FIG. 19 through FIG. 22. These transmission and reception record screens 33 through 40 include "number" column, "destination" or "origin" column, "date and time" column, "subject" column, and "result" column. Excluding the "number" column, the information stored in each column in the abovementioned communication record tables 28a, 28b is to be displayed.

In S202, when "(1) display all communication records" is selected by the operator (S204), the transmission record screen 33 and the reception record screen 34 as shown in FIG. 19, are output and displayed on the display 10a or the client PC 24 (S205). In other words, all communication records stored in the transmission record table 28a and the reception record table 28b as shown in FIG. 10 are displayed on the transmission record screen 33 and the reception record screen 34 respectively in the order of the communication date and time, and the line number is displayed in the "number" column. Therefore, it is to be displayed of all of the transmission record T01 of the first transmission, the transmission record T02 of the second transmission, the receiving recoded R01 of the first receiving, and the reception record R02 of the second receiving, which are transmitted and received under the transmission by the ability exchanging function.

In S202, when "(2) display only transmission record" is selected by the operator (S206), the transmission record screen 35 and the reception record screen 36, as shown in FIG. 20, that are abbreviated of the reception record R01 of the first receiving and the reception record R02 of the second receiving, are output and displayed on the display 10a or the client PC 24 (S207). In other words, in the transmission record screen 35, all transmission records stored in the transmission record table 28a are displayed in the order of the transmission date and time, however, in the reception record screen 36, the reception records are displayed in the order of the communication date and time, excluding the reception records R01, R02 that include "receiving 1" or "receiving 2" in the information stored in the "ability exchanging function" column. As a result, the displaying is abbreviated for the communication record relating to the electronic mail that does not accompany the substantial content (image data) among the transmission and reception of the series of the electronic mails relating to the transmission by the ability exchanging function, and the communication record screen can be displayed in the manner easily understood by the operator.

In S202, when "(3) display series of communication consecutively" is selected by the operator (S208), the transmission record screen 37 and the reception record screen 38 as shown in FIG. 21 are output and displayed on the display 10a or the client PC 24 (S209), wherein the screens 37, 38 consecutively display the transmission record T01 of the first transmission, the transmission record T02 of the second transmission, and the reception record R01 of the first receiving, the reception record R02 of the second receiving. In other words, for the transmission record screen 37, the transmission record of the transmission record table 28a (FIG. 10) is extracted and arranged in the order of the transmission date and time. In addition, for the transmission record T01 and the transmission record T02 to be displayed consecutively, after the transmission record T01 with "transmission 1" stored in the "ability exchanging function" column, the transmission record T02 is to be inserted that has the communication identifying information 45 same as the transmission record T01 and "transmission 2" stored in the "ability exchanging function" column, to form the transmission record screen 37. Then, the transmission record screen 37 is output to the display 10a or the like, and the transmission record T01 and the transmission record T02 are displayed consecutively. Then, to inform the operator that the transmission records relate to the series of the electronic mails transmitted and received under the transmission by the ability exchanging function, same line number is displayed in the "number" column, and the communication procedure information 46 is also displayed.

Moreover, also in the reception record screen 38, the reception record of the reception record table 28b is to be extracted and arranged in the order of the received date and time, and for the reception record R01 and the reception record R02 to be displayed consecutively, after the reception record R01 of which "receiving 1" is stored in the "ability exchanging function" column, the reception record R02 is to be inserted that has the communication identifying information 45 same as the reception record R01 and with "receiving 2" stored in the "ability exchanging function" column, to form the reception record screen 38. Then, the reception record screen 38 is output to the display 10a or the like, the reception record R01 and the reception record R02 are to be displayed consecutively. In the "number" column, same line number is displayed for those having the same communication identifying information 45, and the communication procedure information 46 is also displayed. The Internet facsimile machine of the of the transmitting side 1A displays the transmission record or the reception record relating to the transmission and reception of the series of the electronic mails by the ability exchanging function consecutively, and same line number is applied and displayed. Therefore, even when all communication records are displayed, the operator can grasp the plurality of communication records T01, T02, R01, R02 relating to the transmission by the ability exchanging function, as relating to single transmission.

In S202, in the case the operator selects "(4) display only transmission record of high quality image data" (S208), for the series of the communication records relating to the transmission by the ability exchanging function, it is determined in which "result" column an "error" is stored (S210). In the case the "error" is not stored at all (in the communication record table 28 shown in FIG. 10, the "error" is stored, however, it is to be described by assuming that the "error" is not stored), the transmission record screen 39 and the reception record screen 40 as shown in FIG. 22, that are abbreviated of the transmission record T01 of the first transmission, the reception record R01 of the first receiving, and the reception record R02 of the second receiving, are output and displayed on the display 10a or the client PC 24 (S211). In other words, for the transmission record screen 39, the transmission record of the transmission record table 28a is displayed in the order of the communication date and time, excluding the transmission record T01 of which "transmission 1" is stored in the "ability exchanging function" column. In addition, in the "date and time" column in the transmission record T02 including "transmission 2" in the "ability exchanging function" column, as shown in the drawing, the communication time of the first transmission and the second receiving, and the communication time from the first transmission until the second receiving are displayed with parenthesis. As in the manner, for the communication records T01, T02, R01, R02 of the series of the communication by the ability exchanging function, since only the transmission record T02 of the second transmission is displayed, the operator is not to be confused by the communication records T01, R01, R02, etc. of the communication record for other than the second transmission being displayed meaninglessly at the same time afterwards.

Meanwhile, in the case it is determined in S210 that the "error" is stored in the "result" column for any of the communication records, the transmission record screen 39A and the reception record screen 40A as shown in FIG. 23 are output and displayed on the display 10a or the client PC 24 (S212). In the transmission record screen 39A and the reception record screen 40A, same displaying is carried out as in S211, however, the display differs in the "result" column. In other words, in the transmission record T02 of the second transmission, "transmission 1", "transmission 2", "receiving 1", "receiving 2", etc. are displayed in the "result" column as the information for specifying the stage the error generated during the transmission and reception of the series of the electronic mails. For example, in the case the "error" is stored in the "result" column in the transmission record T01 for the first transmission in the transmission record table 28a by receiving the error mail as the response to the first transmission, "transmission 1 error" is to be displayed in the "result" column in the transmission record T02 of the transmission record screen 39A. Therefore, as in the communication record screens 39A, 40A, only the transmission record T02 of the second transmission is displayed, and even if the transmission record T01, the reception records R01, R02, etc. are not displayed, by looking at "transmission 1 error", "transmission 2 error", etc. displayed in the "result" column, the operator can learn at which stage the error generated.

In the present embodiment, it was described of the Internet facsimile machine of the transmitting side 1A that is to be the side to transmit the image data. In the Internet facsimile machine of the receiving side 1B that is to be the side to receive the image data, as in the same manner as in the Internet facsimile machine of the transmitting side 1A, the communication management recording table is memorized, and the communication record information is stored to the reception record table or the transmission record table each time when there is a reception or a transmission.

Consequently, an operator or the like at the receiving side can grasp the communication record of a plurality of electronic mails relating to the ability exchanging function, as a series of records. In addition, among the communication records of a plurality of electronic mails, it is possible to output only the reception record relating to the electronic mail having the image data, or to output only the reception record of specific electronic mails.

What is claimed is:

1. An Internet facsimile machine comprising:
   a processor having an ability exchanging function for exchanging a series of electronic mails with a receiving device that relate to a single transmission, including transmitting to the receiving device a first electronic mail that includes format information of original image data and standard format image data, receiving from the receiving device a second electronic mail that includes machine receiving ability information of the receiving device, and transmitting to the receiving device a third electronic mail that includes image data formed from the original image data in accordance with the machine receiving ability information, wherein the relation of the series of electronic mails to the single transmission is indicated by a common message ID in the electronic mails;

the processor having a communication management recording function for storing a communication record table of the series of electronic mails, and outputting the communication record table;

a storage device storing communication identifying information and communication procedure information for the series of electronic mails as a plurality of communication records; and a communication records outputting device for outputting the communication records formed in accordance with the communication identifying information and the communication procedure information and name the communication records of the series of the electronic mails when outputting the communication record table by the processor having the communication management recording function, wherein the communication record table is formatted according to common message ID to show the relation of the series of electronic mails to the single transmission, wherein the communication records outputting device outputs only a reception record of the electronic mails including the image data that is formed in accordance with the machine receiving ability information, among the communication records of the series of electronic mails.

2. The Internet facsimile machine according to claim 1, wherein the communication record table includes destination information.

3. The Internet facsimile machine according to claim 1, wherein communication record table includes a date and a time an electronic mail was transmitted or received.

4. The Internet facsimile machine according to claim 1, wherein the common message ID is a message ID of the first electronic mail.

5. An Internet facsimile machine comprising:

a processor having an ability exchanging function for exchanging a series of electronic mails with a receiving device that relate to a single transmission, including transmitting to the receiving device a first electronic mail that includes format information of original image data and standard format image data, receiving from the receiving device a second electronic mail that includes machine receiving ability information of the receiving device, and transmitting to the receiving device a third electronic mail that includes image data formed from the original image data in accordance with the machine receiving ability information, wherein the relation of the series of electronic mails to the single transmission is indicated by a common message ID in the electronic mails;

the processor having a communication management recording function for storing a communication record table of the series of electronic mails, and outputting the communication record table;

a storage device storing communication identifying information and communication procedure information for the series of electronic mails as a plurality of communication records; and a communication records outputting device for outputting the communication records formed in accordance with the communication identifying information and the communication procedure information and using the communication records of the series of the electronic mails when outputting the communication record table by the processor having the communication management recording function, wherein the communication record table is formatted according to common message ID to show the relation of the series of electronic mails to the single transmission, wherein the communication records outputting device outputs only a reception record of the electronic mails including the image data formed in accordance with the machine receiving ability information, among the communication records of the series of electronic mails.

6. An Internet facsimile machine comprising:

a processor having an ability exchanging function for exchanging a series of electronic mails with a receiving device that relate to a single transmission including transmitting to the receiving device a first electronic mail that includes format information of original image data and standard format image data, receiving from the receiving device a second electronic mail that includes machine receiving ability information of the receiving device, and transmitting to the receiving device a third electronic mail that includes image data formed from the original image data in accordance with the machine receiving ability information wherein the relation of the series of electronic mails to the single transmission is indicated by a common message ID in the electronic mails;

the processor having a communication management recording function for storing a communication record table of the series of electronic mails, and outputting the communication record table;

a storage device storing communication identifying information and communication procedure information for the series of electronic mails as a plurality of communication records; and a communication records outputting device for outputting the communication records formed in accordance with the communication identifying information and the communication procedure information and using the communication records of the series of the electronic mails when outputting the communication record table by the processor having the communication management recording function wherein the communication record table is formatted according to common message ID to show the relation of the series of electronic mails to the single transmission, wherein the communication record table includes a plurality of series of electronic mails, each of the plurality of series being grouped together by common message ID and apart from other series having a different message ID.

7. An Internet facsimile machine comprising:

a means having an ability exchanging function for exchanging a series of electronic mails with a receiving device that relate to a single transmission, including transmitting to the receiving device a first electronic mail that includes format information of original image data and standard format image data, receiving from the receiving device a second electronic mail receiving ability information of the receiving device, and transmitting to the receiving device a third electronic mail that includes image data formed from the original image data in accordance with the machine receiving ability information, wherein the relation of the series of electronic mails to the single transmission is indicated by a common message ID in the electronic mails;

a means having a communication management recording function for storing a communication record table of the series of electronic mails, and outputting the communication record table;

a storage means for storing communication identifying information and communication procedure information for the series of electronic mails as a plurality of communication records; and a communication records outputting means for outputting the communication records formed in accordance with the communication identifying information and the communication procedure information and using the communication records of the series of the electronic mails when outputting the communication record table by the means having the communication management recording function, wherein the communication record table is formatted according to common message ID to show the relation of the series of electronic mails to the single transmission, wherein the communication records outputting means outputs only a transmission record of the electronic mails including the image data that is formed in accordance with the machine receiving ability information, among the communication records of the series of electronic mails.

8. The Internet facsimile machine according to claim 7, wherein the common message ID is a message ID of the first electronic mail.

9. An Internet facsimile machine comprising:

a means having an ability exchanging function for exchanging a series of electronic mails with a receiving device that relate to a single transmission, including transmitting to the receiving device a first electronic mail that includes format information of original image data and standard format image data, receiving from the receiving device a second electronic mail receiving ability information of the receiving device, and transmitting to the receiving device a third electronic mail that includes image data formed from the original image data in accordance with the machine receiving ability information, wherein the relation of the series of electronic mails to the single transmission is indicated by a common message ID in the electronic mails;

a means having a communication management recording function for storing a communication record table of the series of electronic mails, and outputting the communication record table;

a storage means for storing communication identifying information and communication procedure information for the series of electronic mails as a plurality of communication records; and a communication records outputting means for outputting the communication records formed in accordance with the communication identifying information and the communication procedure information and using the communication records of the series of the electronic mails when outputting the communication record table by the means having the communication management recording function, wherein the communication record table is formatted according to common message ID to show the relation of the series of electronic mails to the single transmission, wherein the communication records outputting means outputs only a reception record of the electronic mails including the image data formed in accordance with the machine receiving ability information, among the communication records of the series of electronic mails.

10. The Internet facsimile machine according to claim 9, wherein the communication record table includes destination information.

11. The Internet facsimile machine according to claim 9, wherein communication record table includes a date and a time an electronic mail was transmitted or received.

12. An Internet facsimile machine comprising:

a means having an ability exchanging function for exchanging a series of electronic mails with a receiving device that relate to a single transmission, including transmitting to a the receiving device a first electronic mail that includes format information of original image data and standard format image data, receiving from the receiving device a second electronic mail receiving ability information of the receiving device, and transmitting to the receiving device a third electronic mall that includes image data formed from the original image data in accordance with the machine receiving ability information, wherein the relation of the series of electronic mails to the single transmission is indicated by a common messaae ID in the electronic mails;

a means having a communication management recording function for storing a communication record table of the series of electronic mails, and outputting the communication record table;

a storage means for storing communication identifying information and communication procedure information for the series of electronic mails as a plurality of communication records; and a communication records outputting means for outputting the communication records formed in accordance with the communication identifying information and the communication procedure information and using the communication records of the series of the electronic mails when outputting the communication record table by the means having the communication management recording function, wherein the communication record table is formatted according to common message ID to show the relation of the series of electronic mails to the single transmission, wherein the communication record table includes a plurality of series of electronic mails, each of the plurality of series being grouped together by common message ID and apart from other series having a different message ID.

13. A method for processing electronic mail comprising:

transmitting to a receiving device a first electronic mail that includes format information of original image data and standard format image data;

receiving from the receiving device a second electronic mail that includes machine receiving ability information of the receiving device;

transmitting to the receiving device a third electronic mail that includes image data formed from the original image data in accordance with the machine receiving ability information, wherein the first, second and third electronic mails include a common message ID to indicate a relation to a single transmission;

storing a communication record table of the series of electronic mails;

storing communication identifying information and communication procedure information for the series of electronic mails as a plurality of communication outputting the communication records formed in accordance with the communication identifying information and the communication procedure information and using the communication records of the series of the electronic mails when outputting the communication record table, wherein the communication record table is formatted according to common message ID to show the relation of the series of electronic mails to the single transmission; and outputting only a transmission record of the electronic mails including the image data that is formed in accordance with the machine receiving ability information, among the communication records of the series of electronic mails.

14. The method according to claim 13, wherein the common message ID is a message ID of the first electronic mail.

15. A method for processing electronic mail comprising:

transmitting to a receiving device a first electronic mail that includes format information of original image data and standard format image data;

receiving from the receiving device a second electronic mail that includes machine receiving ability information of the receiving device;

transmitting to the receiving device a third electronic mail that includes image data formed from the original image data in accordance with the machine receiving ability information, wherein the first, second and third electronic mails include a common message ID to indicate a relation to a single transmission;

storing a communication record table of the series of electronic mails;

storing communication identifying information and communication procedure information for the series of electronic mails as a plurality of communication records;

outputting the communication records formed in accordance with the communication identifying information and the communication procedure information and using the communication records of the series of the electronic mails when outputting the communication record table, wherein the communication record table is formatted according to common message ID to show the relation of the series of electronic mails to the single transmission; and outputting only a reception record of the electronic mails including the image data formed in accordance with the machine receiving ability information, among the communication records of the series of electronic mails.

16. A method for processing electronic mail comprising:

transmitting to a receiving device a first electronic mail that includes format information of original image data and standard format image data;

receiving from the receiving device a second electronic mail that includes machine receiving ability information of the receiving device;

transmitting to the receiving device a third electronic mail that includes image data formed from the original image data in accordance with the machine receiving ability information, wherein the first, second and third electronic mails include a common message ID to indicate a relation to a single transmission;

storing a communication record table of the series of electronic mails;

storing communication identifying information and communication procedure information for the series of electronic mails as a plurality of communication records; and outputting the communication records formed in accordance with the communication identifying information and the communication procedure information and using the communication records of the series of the electronic mails when outputting the communication record tablet wherein the communication record table is formatted according to common message ID to show the relation of the series of electronic mails to the single transmission, wherein the communication record table includes a plurality of series of electronic mails, each of the plurality of series being grouped together by common message ID and apart from other series having a different message ID.

* * * * *